(12) United States Patent
Ataguchi

(10) Patent No.: US 9,786,315 B1
(45) Date of Patent: Oct. 10, 2017

(54) DISC DEVICE

(71) Applicant: Panasonic Intellectual Property Management Co., Ltd., Osaka (JP)

(72) Inventor: Osamu Ataguchi, Osaka (JP)

(73) Assignee: PANASONIC INTELLECTUAL PROPERTY MANAGEMENT CO. LTD., Osaka (JP)

( * ) Notice: Subject to any disclaimer, the term of this patent is extended or adjusted under 35 U.S.C. 154(b) by 0 days.

(21) Appl. No.: 15/435,745

(22) Filed: Feb. 17, 2017

Related U.S. Application Data

(63) Continuation of application No. PCT/JP2016/003474, filed on Jul. 27, 2016.

(30) Foreign Application Priority Data

Mar. 25, 2016 (JP) ................................. 2016-061192

(51) Int. Cl.
*G11B 17/30* (2006.01)
*G11B 17/03* (2006.01)
*G11B 17/028* (2006.01)
*G11B 17/051* (2006.01)

(52) U.S. Cl.
CPC .......... *G11B 17/03* (2013.01); *G11B 17/0284* (2013.01); *G11B 17/051* (2013.01)

(58) Field of Classification Search
None
See application file for complete search history.

(56) References Cited

U.S. PATENT DOCUMENTS

| 5,812,511 A | 9/1998 | Kawamura et al. |
|---|---|---|
| 2013/0263162 A1 | 10/2013 | Yoshida et al. |
| 2014/0310732 A1* | 10/2014 | Goto ................. G11B 17/0284 720/604 |

FOREIGN PATENT DOCUMENTS

| JP | 6-68482 | 3/1994 |
|---|---|---|
| JP | 7-141811 | 6/1995 |
| JP | 7-161112 | 6/1995 |
| JP | 08249674 A * | 9/1996 |
| JP | 2001-118351 | 4/2001 |
| JP | 2002-32973 | 1/2002 |

(Continued)

OTHER PUBLICATIONS

International Search Report issued Oct. 25, 2016 in International (PCT) Application No. PCT/JP2016/003474.

*Primary Examiner* — Will J Klimowicz
(74) *Attorney, Agent, or Firm* — Wenderoth, Lind & Ponack, L.L.P.

(57) ABSTRACT

A disc device includes a first traverse chassis holding a first optical pickup unit which performs recording/reproduction of information on a first surface of a disc, a second traverse chassis holding a second optical pickup unit which performs recording/reproduction of information on a second surface of the disc, and first and second biasing members which bias the first and second traverse chassis, respectively, in directions of coming closer to each other. The first and second traverse chassis are coupled to each other so as to turn around a turning axis at a rear side of a housing and extending in a width direction of the housing. At least one of the first and the second biasing members is attached while being inclined with respect to each of a conveying direction of the disc, and a thickness and the width directions of the housing.

6 Claims, 19 Drawing Sheets

(56) References Cited

FOREIGN PATENT DOCUMENTS

| | | | |
|---|---|---|---|
| JP | 2005-116029 | 4/2005 | |
| JP | 2005116033 A * | 4/2005 | |
| JP | 2005116034 A * | 4/2005 | |
| JP | 2005116035 A * | 4/2005 | |
| JP | 2005116036 A * | 4/2005 | ............ G11B 7/082 |
| JP | 2005116037 A * | 4/2005 | |
| JP | 2006040470 A * | 2/2006 | |
| JP | 2010027173 A * | 2/2010 | |
| JP | 2013-145624 | 7/2013 | |
| JP | 2013-206498 | 10/2013 | |

\* cited by examiner

US 9,786,315 B1

DISC DEVICE

BACKGROUND

1. Technical Field

The present disclosure relates to a disc device which is capable of recording and/or reproduction (hereinafter abbreviated as recording/reproduction) of information on an optical disc such as a DVD (digital versatile disk), a BD (Blu-ray (registered trademark) disc), or an AD (Archival Disc).

2. Description of the Related Art

Conventionally, disc devices of various structures are known (for example, see Japanese Patent Unexamined Publication No. 2013-145624). A conventional disc device is generally structured to be able to perform recording/reproduction on one main surface of one disc. In the following, this type of disc device will alternatively be referred to as a "disc drive".

Also, in recent years, a disc device which includes a plurality of disc drives and is structured to be able to simultaneously perform recording/reproduction on a plurality of discs is also becoming widespread (for example, see Japanese Patent Unexamined Publication No. 2013-206498). In the following, this type of disc device will alternatively be referred to as a "data archiver".

SUMMARY

The present disclosure provides a disc device which is capable of increasing positional accuracy of a first optical pickup unit and a second optical pickup unit with respect to a disc.

A disc device of the present disclosure includes a housing, a tray, a tray conveying mechanism, a first optical pickup unit, a first traverse chassis, a second optical pickup unit, a second traverse chassis, and a first biasing member and a second biasing member. The housing is provided with a tray conveying opening at a side surface thereof. A disc is to be placed on the tray. The tray conveying mechanism conveys the tray in a conveying direction through the tray conveying opening, between an ejection position outside the housing and a recording/reproduction position inside the housing. The first optical pickup unit is provided in a manner capable of moving in a radial direction of the disc with respect to a first surface of the disc at the recording/reproduction position, and performs at least one of recording and reproduction of information on the first surface. The first traverse chassis movably holds the first optical pickup unit. The second optical pickup unit is provided in a manner capable of moving in the radial direction of the disc with respect to a second surface on a back side of the first surface of the disc at the recording/reproduction position, and performs at least one of recording and reproduction of information on the second surface. The second traverse chassis movably holds the second optical pickup unit. The first biasing member and the second biasing member bias the first traverse chassis and the second traverse chassis, respectively, in directions of coming closer to each other. The first traverse chassis and the second traverse chassis are coupled to each other so as to turn around a turning axis. The turning axis is at a position, of the housing, opposite the side surface and extends in a width direction of the housing orthogonal to the conveying direction and a thickness direction of the housing. At least one of the first biasing member and the second biasing member includes a first end attached to the first traverse chassis and a second end attached to the second traverse chassis, and is inclined with respect to each of the conveying direction, the thickness direction and the width direction.

The disc device according to the present disclosure is capable of increasing the positional accuracy of the first optical pickup unit and the second optical pickup unit with respect to a disc.

DETAILED DESCRIPTION OF PREFERRED EMBODIMENT

Prior to describing an exemplary embodiment of the present disclosure, problems of a conventional device will be briefly described.

A data archiver includes a plurality of disc drives, and therefore, there is a tendency that a size of the device is increased. Moreover, there is also a tendency that an amount of data which the data archiver is expected to be able to record/reproduce is increased.

Accordingly, a disc device which is capable of performing recording/reproduction simultaneously on both main surfaces of one disc is being considered. Specifically, a disc device including a first optical pickup unit which performs recording/reproduction on a first surface of one disc, and a second optical pickup unit which performs recording/reproduction on a second surface of the same disc is being considered. According to this disc device, an increase in the size of the device may be suppressed, and also, the amount of data that can be recorded/reproduced may be increased.

However, with this type of disc device, because recording/reproduction is to be performed simultaneously on both main surfaces of one disc, positional accuracy of the first optical pickup unit and the second optical pickup unit on the disc needs to be increased.

Hereinafter, a disc device according to an exemplary embodiment will be described in detail with reference to the drawings as appropriate. However, unnecessarily detailed description may be omitted. For example, detailed description of already well-known matters and repeated description of substantially the same structure may be omitted. All of such omissions are intended to facilitate understanding by those skilled in the art by preventing the following description from becoming unnecessarily redundant.

Additionally, the appended drawings and the following description are provided for those skilled in the art to fully understand the present disclosure, and the subject described in the claims is not to be limited by the appended drawings and the following description.

Furthermore, in the following description, terms indicating specific directions (for example, terms including "top", "bottom", "right", "left", "front", "back" and the like) are possibly used, but these terms are for facilitating understanding of the disclosure based on the drawings, and the present disclosure is not to be limited by the meanings of these terms.

In the following, a disc device according to a present exemplary embodiment will be described.

<1-1. Structure>

Figure 1:
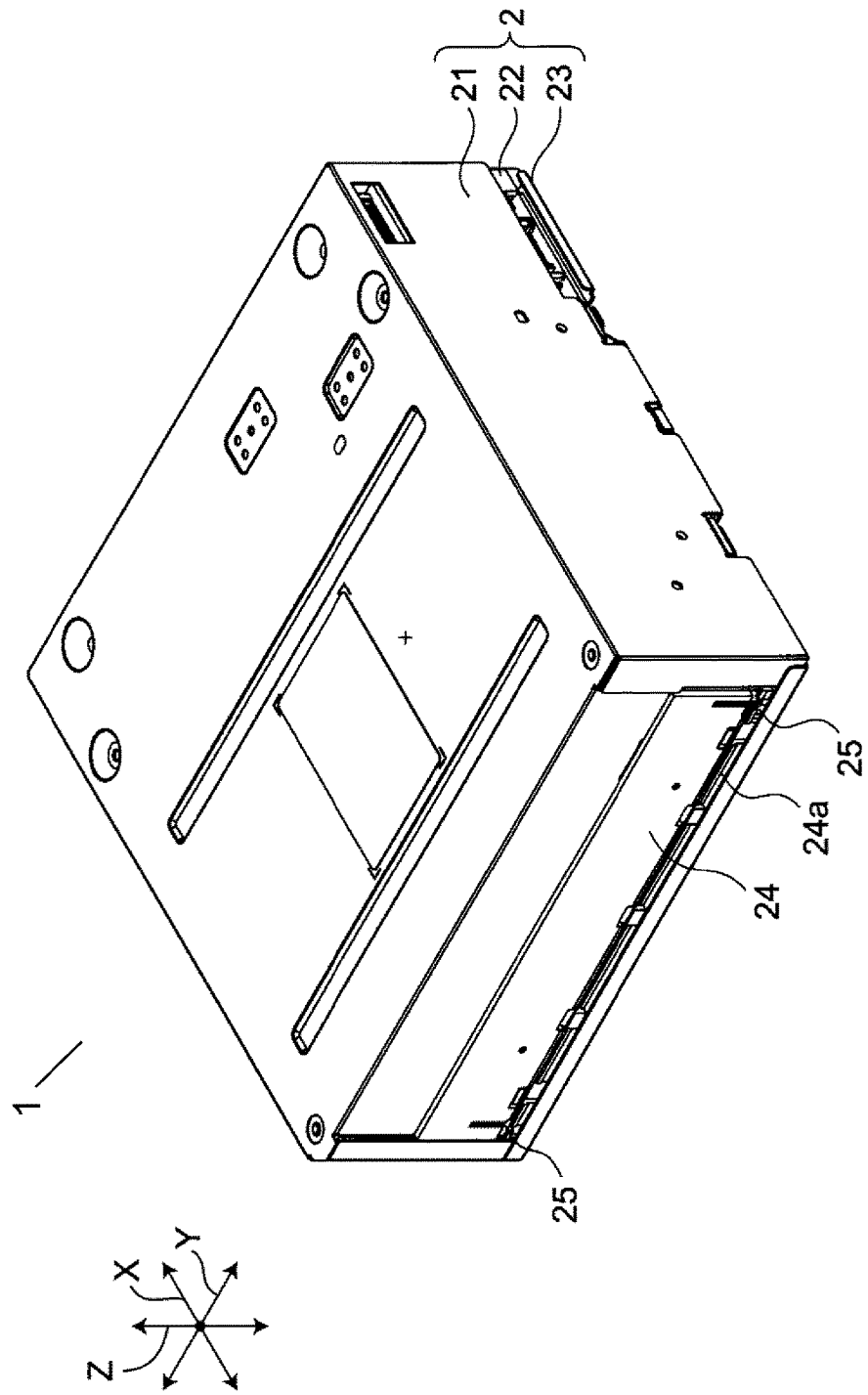
FIG. 1 is a perspective view showing a disc device according to an exemplary embodiment in a state where a tray is at a recording/reproduction position.
Figure 2:
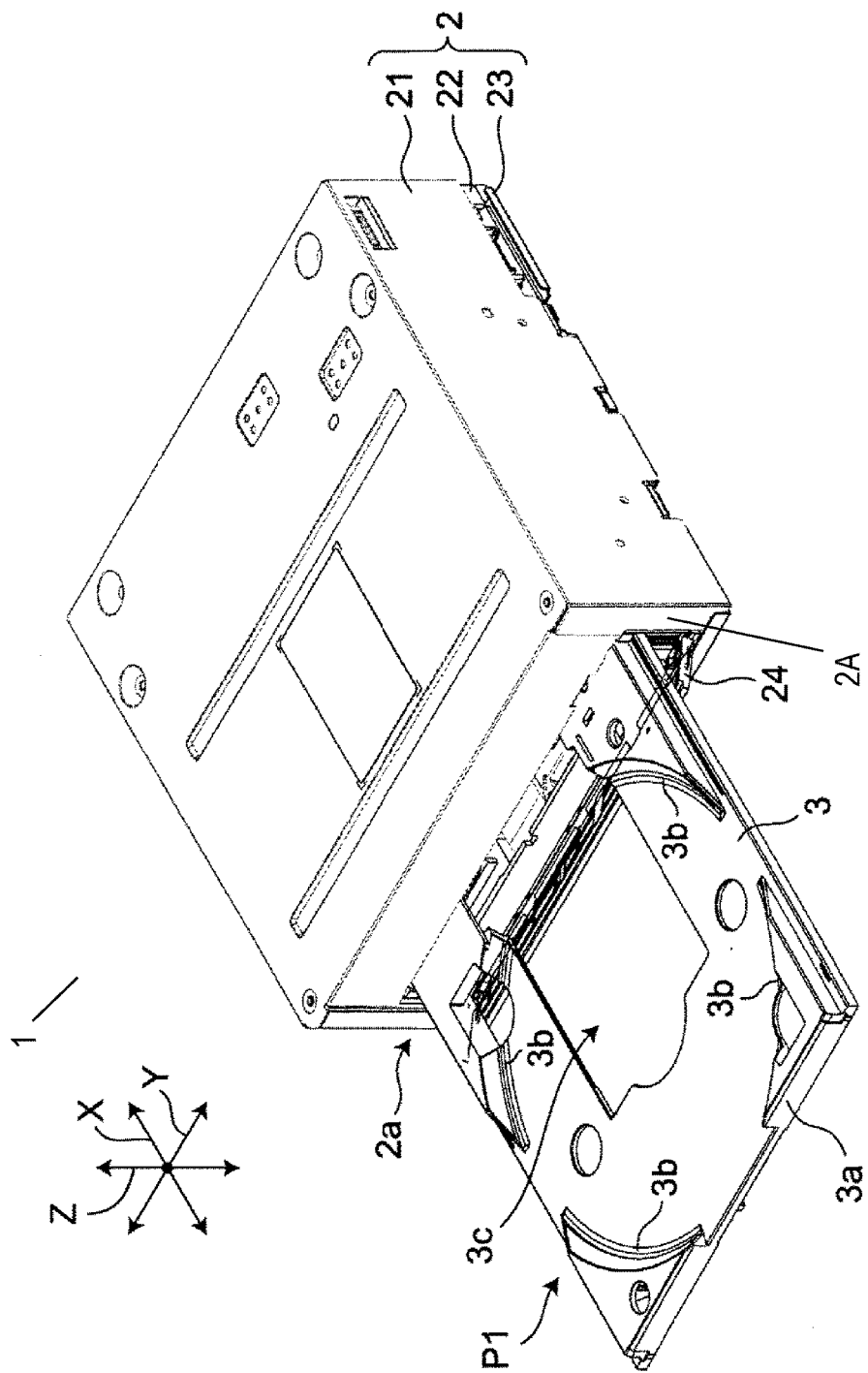
FIG. 2 is a perspective view showing the disc device shown in FIG. 1 in a state where the tray is at an ejection position.
Figure 3:
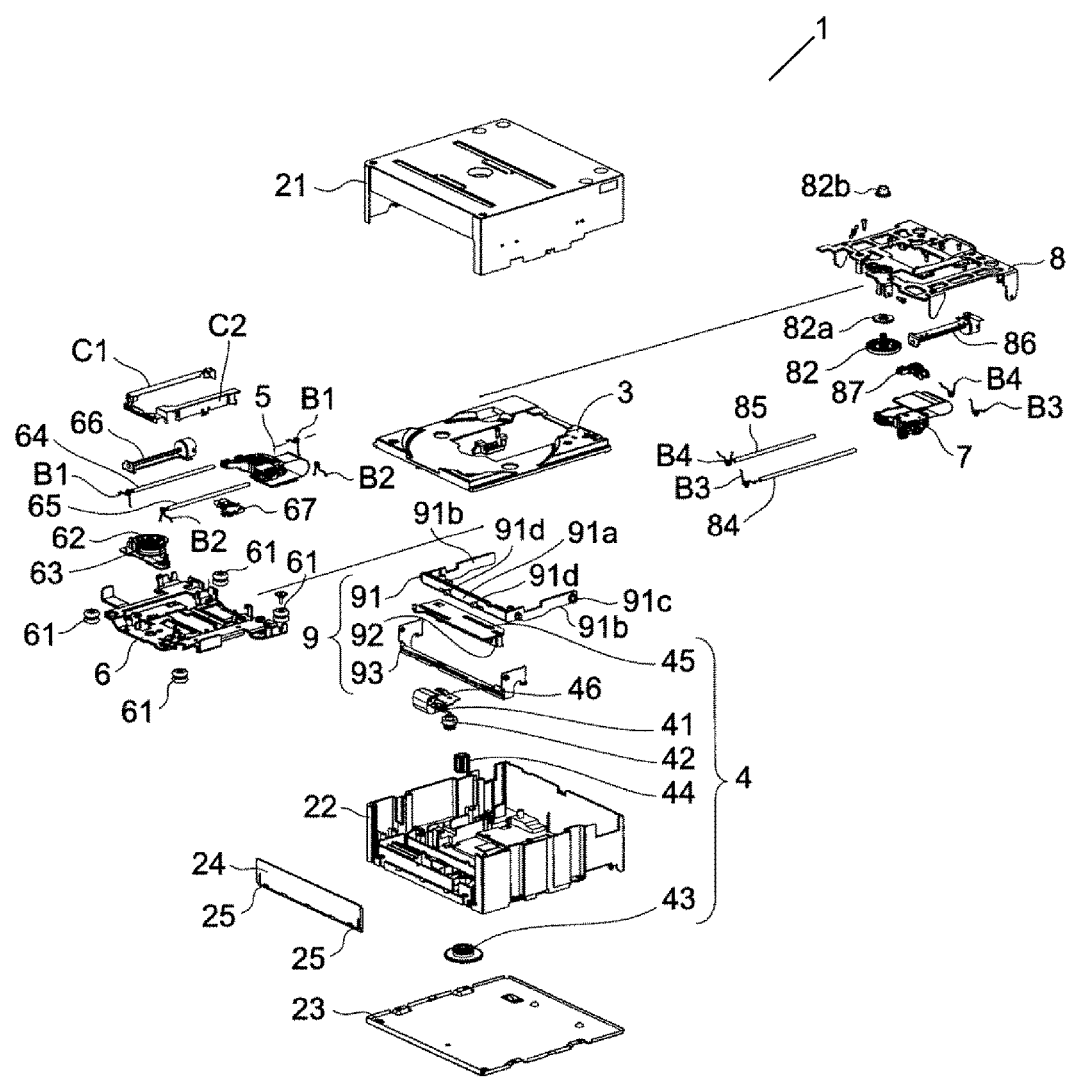
FIG. 3 is an exploded perspective view of the disc device shown in FIG. 1.

FIGS. 1 and 2 are perspective views of disc device 1 according to the exemplary embodiment. FIG. 3 is an exploded perspective view of disc device 1.

As shown in FIGS. 1 and 2, disc device 1 includes substantially cuboid housing 2. As shown in FIG. 3, inside housing 2, tray 3, tray conveying mechanism 4, first optical pickup unit 5, first traverse chassis 6, second optical pickup unit 7, second traverse chassis 8, and turning mechanism 9 are provided.

As shown in FIG. 3, housing 2 includes lid case 21, mechanical chassis 22, and bottom case 23. Various components, devices and mechanisms for recording/reproducing information on both main surfaces of a disc (not shown) are installed to mechanical chassis 22. Both main surfaces of the disc refer to a first surface, and a second surface on a back of the first surface. Mechanical chassis 22 made of resin has a substantially rectangular box shape which is open at a top. Lid case 21 covers the opening portion at the top of mechanical chassis 22, and is fixed to mechanical chassis 22. Bottom case 23 covers a bottom portion of mechanical chassis 22, and is fixed to mechanical chassis 22.

Figure 4:
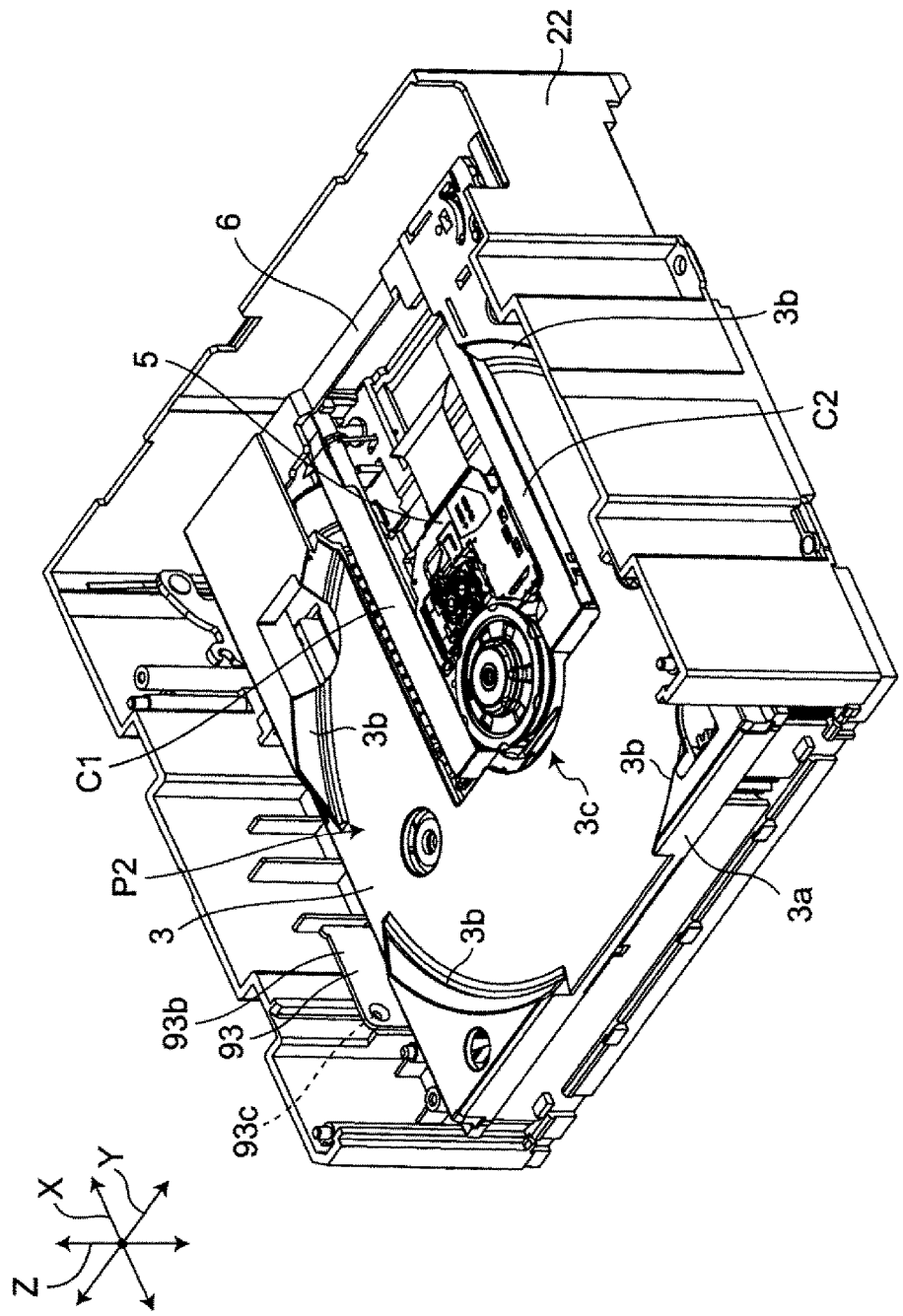
FIG. 4 is a perspective view showing the disc device shown in FIG. 1 in a state where components and the like above the tray are removed.
Figure 5:
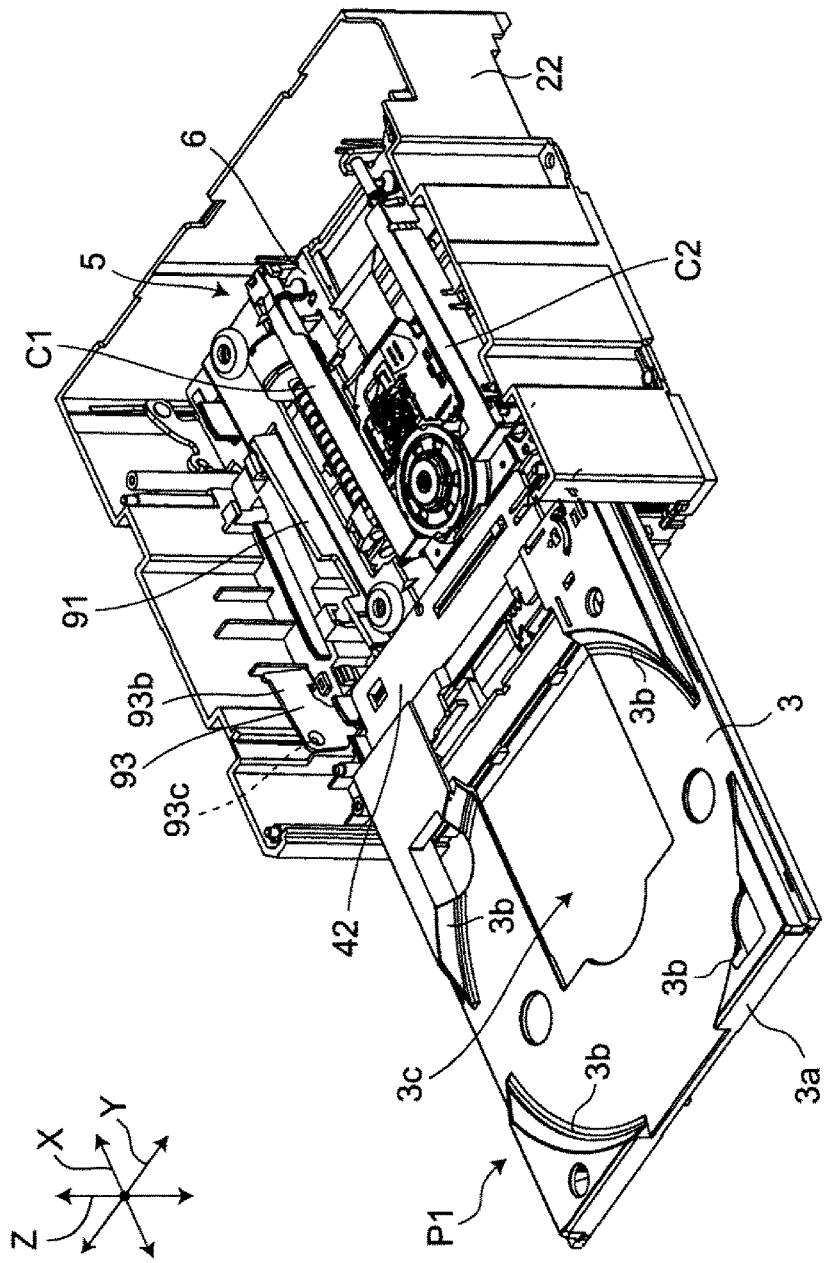
FIG. 5 is a perspective view showing the disc device shown in FIG. 2 in a state where components and the like above the tray are removed.

As shown in FIG. 2, tray conveying opening 2a is provided on side surface 2A at a front (bottom left side in the drawing) of housing 2. Tray conveying opening 2a is an opening portion which is formed to be slightly larger than a width of tray 3. Tray 3 is conveyed, through tray conveying opening 2a and by tray conveying mechanism 4, in conveying direction X between ejection position P1 outside housing 2 shown in FIGS. 2 and 5, and recording/reproduction position P2 inside housing 2 shown in FIG. 4. FIGS. 4 and 5 are perspective views showing a state where components and the like provided above tray 3 are removed.

FIGS. 1 and 4 show a state where tray 3 is conveyed to recording/reproduction position P2 inside housing 2. In this state, tray conveying opening 2a is closed by door 24, which is openably attached to a front of housing 2 as shown in FIG. 1. Door 24 is attached pivotally around turning shaft 24a extending in width direction Y of housing 2 at a lower end portion on the front of housing 2. Door 24 is biased by two coil torsion springs 25 so as to maintain a closed state of tray conveying opening 2a. Note that door 24 and coil torsion springs 25 are not shown in FIG. 4.

FIGS. 2 and 5 show a state where tray 3 is positioned at ejection position P1 outside housing 2. During tray 3 is being conveyed from recording/reproduction position P2 to ejection position P1, front end portion 3a of tray 3 passes through tray conveying opening 2a and pushes door 24 from inside housing 2. Then, door 24 turns around turning shaft 24a against a biasing force of coil torsion springs 25, and tray conveying opening 2a is opened. On the other hand, during tray 3 is being conveyed from ejection position P1 to recording/reproduction position P2, front end portion 3a of tray 3 passes through tray conveying opening 2a and returns to inside housing 2. Then, door 24 turns in a reverse direction around turning shaft 24a by the biasing force of coil torsion springs 25, and tray conveying opening 2a is closed.

A disc such as a DVD, a BD and an AD (not shown) is placed on resin tray 3. In a plan view, tray 3 has a substantially rectangular outer shape. In order to hold the disc without rocking or backlash, a plurality of holding portions 3b are formed to tray 3. Each of holding portions 3b has an arc portion which is to extend along an outer circumferential portion of the disc, and is tapered in such a way that the diameter of the arc portion is increased further away from a surface of tray 3 in an upward direction. Tray 3 is disposed such that a thickness direction of tray 3 matches thickness direction Z of housing 2. Various pieces of information are recorded on both main surfaces of the disc. Tray 3 is provided with opening portion 3c so that recording/reproduction of information may be performed on a first surface (a lower surface) of the disc.

Figure 6:
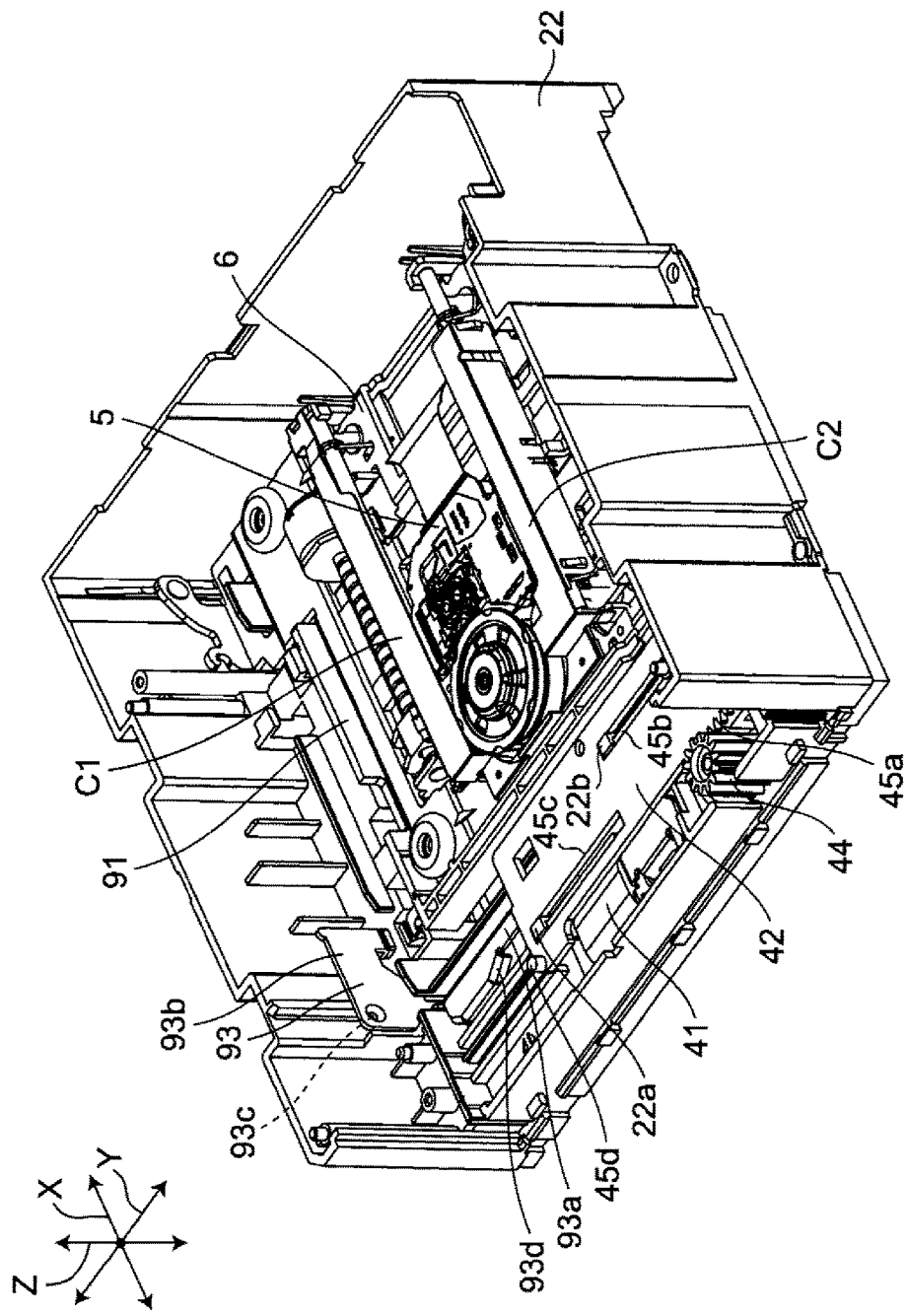
FIG. 6 is a perspective view showing a part of the disc device in a state where the tray is further removed from the state shown in FIG. 4.
Figure 7A:
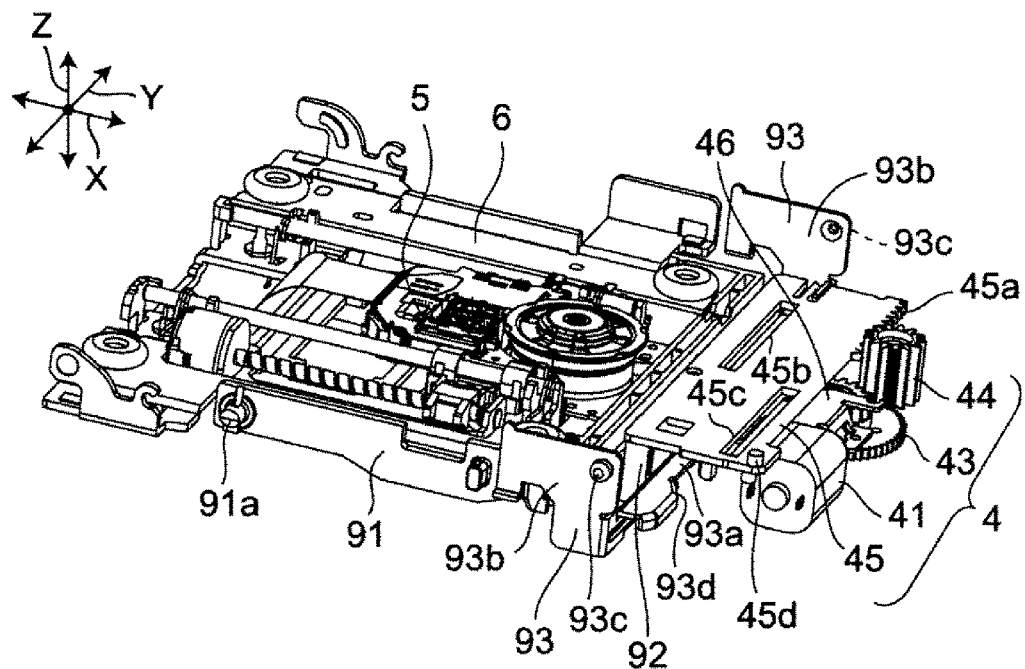
FIG. 7A is a perspective view showing, from obliquely above, a part of the disc device in a state where a mechanical chassis and a bottom case are further removed from the state shown in FIG. 6.
Figure 7B:
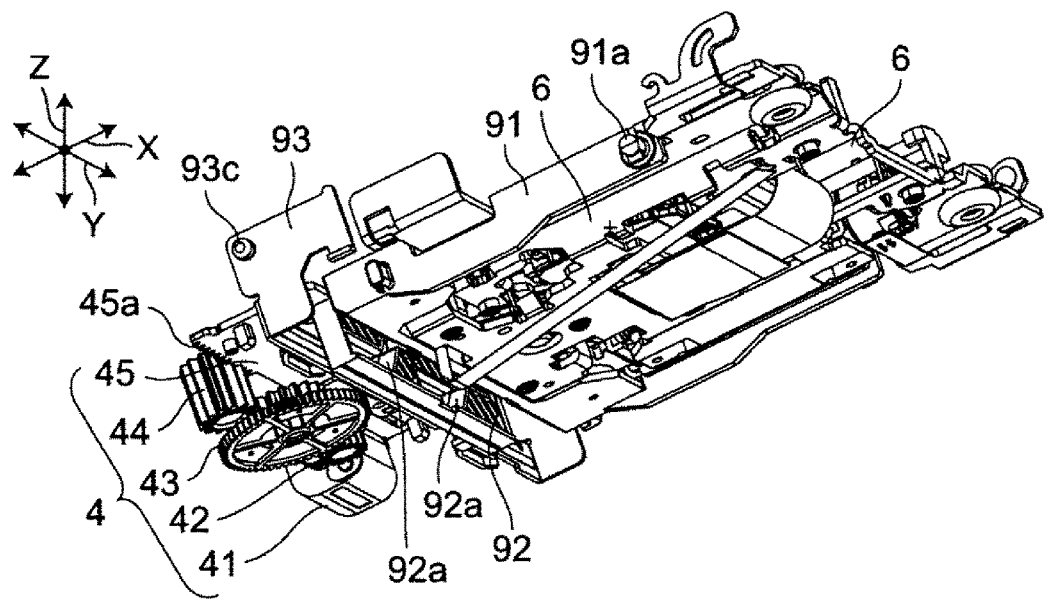
FIG. 7B is a perspective view showing, from obliquely below, a part of the disc device in the state shown in FIG. 7A.

FIG. 6 shows a state where tray 3 is further removed from the state shown in FIG. 4. FIGS. 7A and 7B are perspective views showing, from obliquely above, a part of disc device 1 in a state where mechanical chassis 22 and bottom case 23 are further removed from the state shown in FIG. 6.

Tray conveying mechanism 4 shown in FIGS. 7A and 7B is provided at a front (bottom left side in FIG. 6) of mechanical chassis 22. Tray conveying mechanism 4 conveys tray 3 along conveying direction X through tray conveying opening 2a, between ejection position P1 and recording/reproduction position P2. As shown in FIGS. 3, 7A and 7B, tray conveying mechanism 4 includes loading motor 41, wheel gear 42, intermediate gear 43, drive gear 44, and slider 45. Slider 45 includes rack 45a and cam pin 45d.

Loading motor 41 generates a driving force for conveying tray 3. As will be described later, the driving force generated by loading motor 41 is used also as a driving force for driving turning mechanism 9. Loading motor 41 is attached to mechanical chassis 22 via angle-shaped member 46 for motor.

Wheel gear 42 is meshed with a drive shaft of loading motor 41. Intermediate gear 43 is meshed with wheel gear 42. Intermediate gear 43 includes large-diameter gear portion 43a and small-diameter gear portion 43b. Intermediate gear 43 is meshed with wheel gear 42 by large-diameter gear portion 43a, and is meshed with drive gear 44 by small-diameter gear portion 43b.

Figure 8:
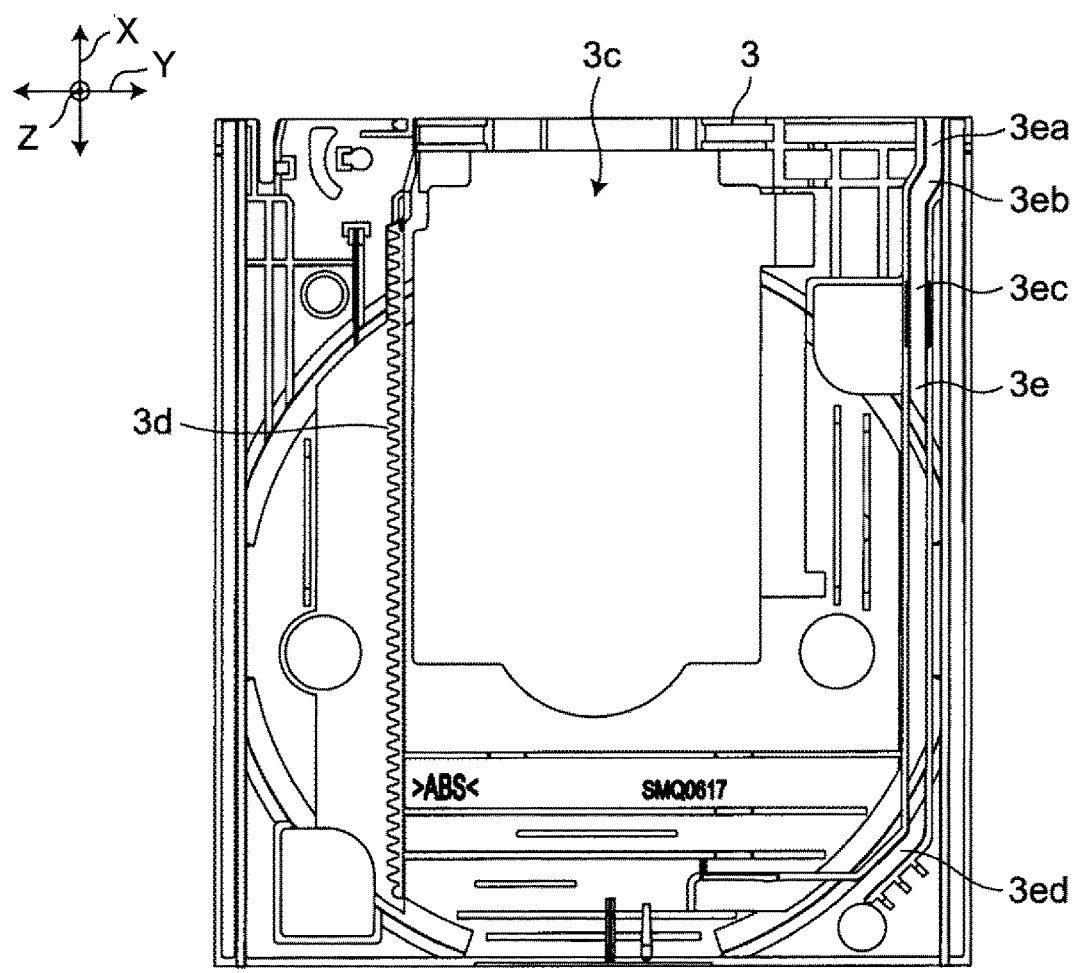
FIG. 8 is a plan view of a surface, of the disc device shown in FIG. 3, opposite a disc placement surface of the tray.

FIG. 8 is a plan view of a surface (hereinafter referred to as a back surface) opposite the disc placement surface of tray 3. Rack 3d extending in conveying direction X is provided on the back surface of tray 3. Drive gear 44 shown in FIGS. 6 to 7B meshes with rack 3d. When loading motor 41 is driven, drive shaft 41a, wheel gear 42, intermediate gear 43, and drive gear 44 are rotated by the driving force. Tray 3 including rack 3d, which meshes with drive gear 44, is conveyed in conveying direction X by the rotation of drive gear 44.

Furthermore, as shown in FIG. 6, when tray 3 is at recording/reproduction position P2, drive gear 44 is meshed with rack 45a, which is provided on a right side of a front end portion of slider 45 as seen from tray conveying opening 2a of housing 2. Slider 45 is provided with two guide grooves 45b, 45c, which extend in width direction Y. Guide piece 22b provided to mechanical chassis 22 is engaged with guide groove 45b. Also, guide piece 22a provided to mechanical chassis 22 is engaged with guide groove 45c.

When drive gear 44 is rotated in a state where drive gear 44 is meshed with rack 45a, slider 45 moves in width direction Y because guide grooves 45b, 45c are guided by guide pieces 22b, 22a, respectively. As shown in FIG. 5, due to this movement, a front end portion (an end portion on slider 45 side) of first traverse chassis 6 holding first optical pickup unit 5 moves away (in a lowering direction) from tray 3. Also, tray 3 moves from recording/reproduction position P2 to ejection position P1. Moreover, due to the movement of the front end portion of first traverse chassis 6 and tray 3, a front end portion of second traverse chassis 8 holding second optical pickup unit 7 moves away (in a rising direction) from tray 3. Turning mechanism 9 for turning first traverse chassis 6 and second traverse chassis 8 will be described later in detail. Meanwhile, each of first traverse chassis 6 and second traverse chassis 8 has a front end portion, and a rear end portion which is farther away from side surface 2A than the front end portion is.

Figure 9A:
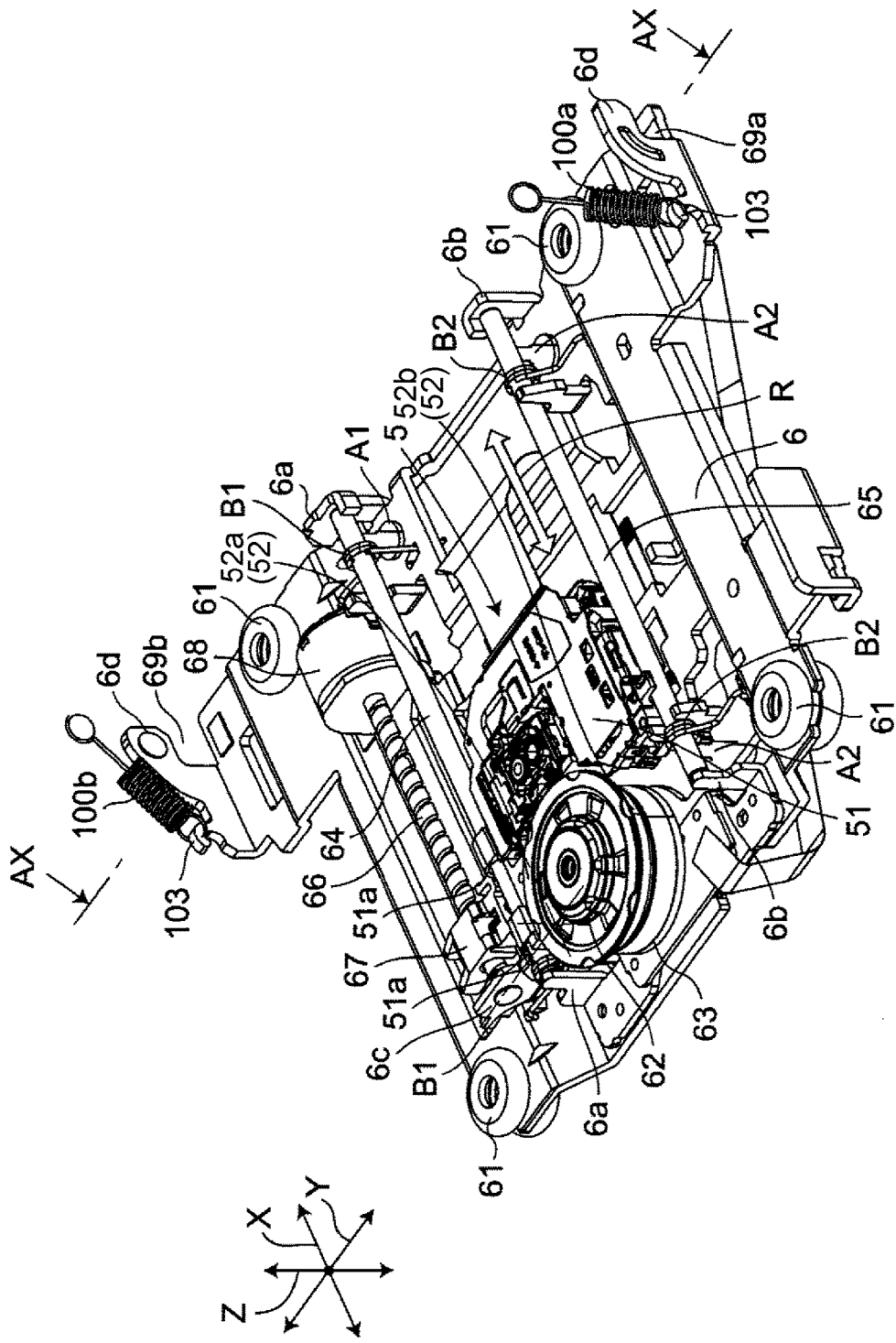
FIG. 9A is a perspective view showing, from obliquely above, a first traverse chassis, of the disc device shown in FIG. 3, holding a first optical pickup unit.
Figure 9B:
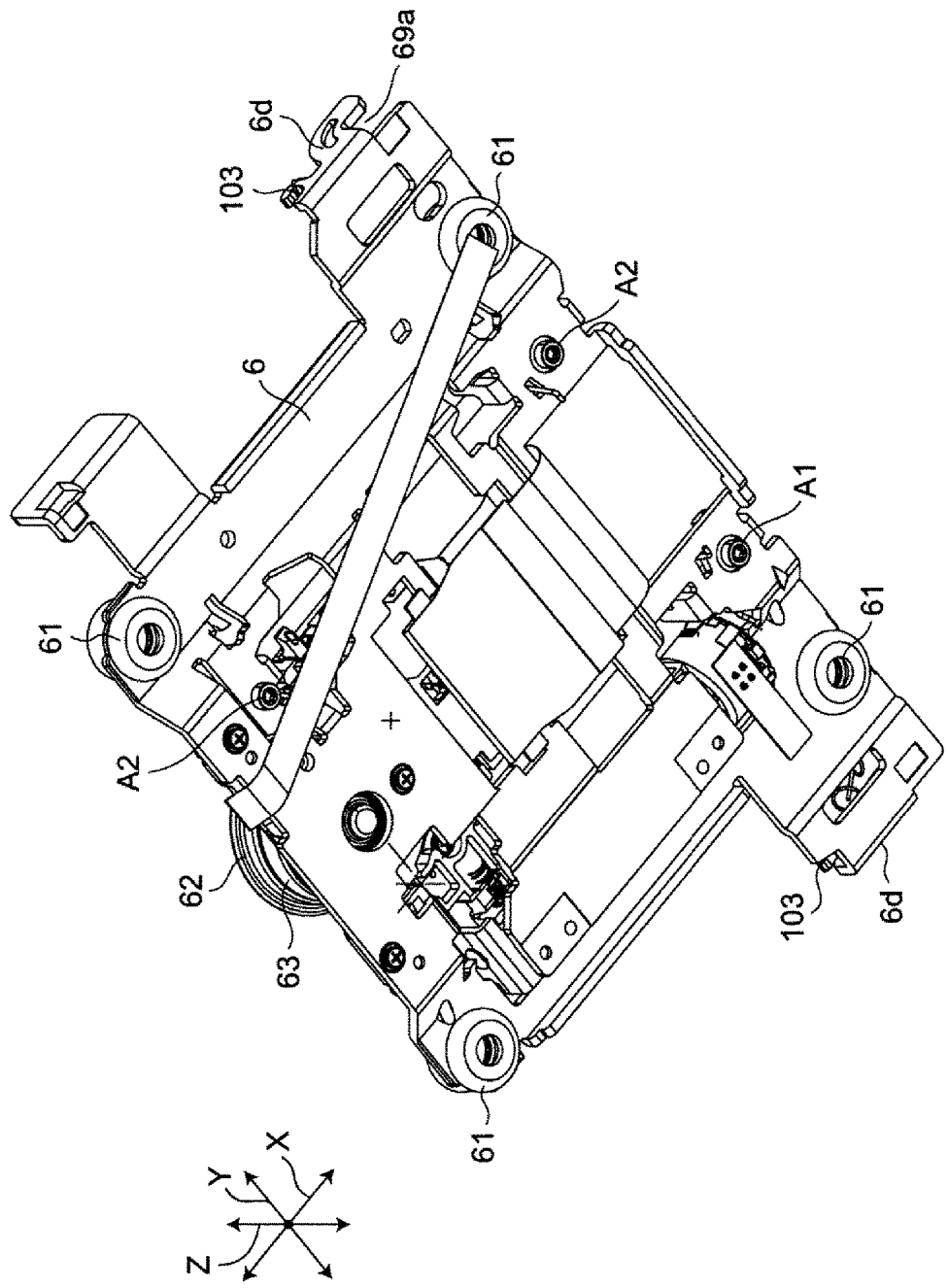
FIG. 9B is a perspective view showing, from obliquely below, the first traverse chassis in the state shown in FIG. 9A.
Figure 9C:
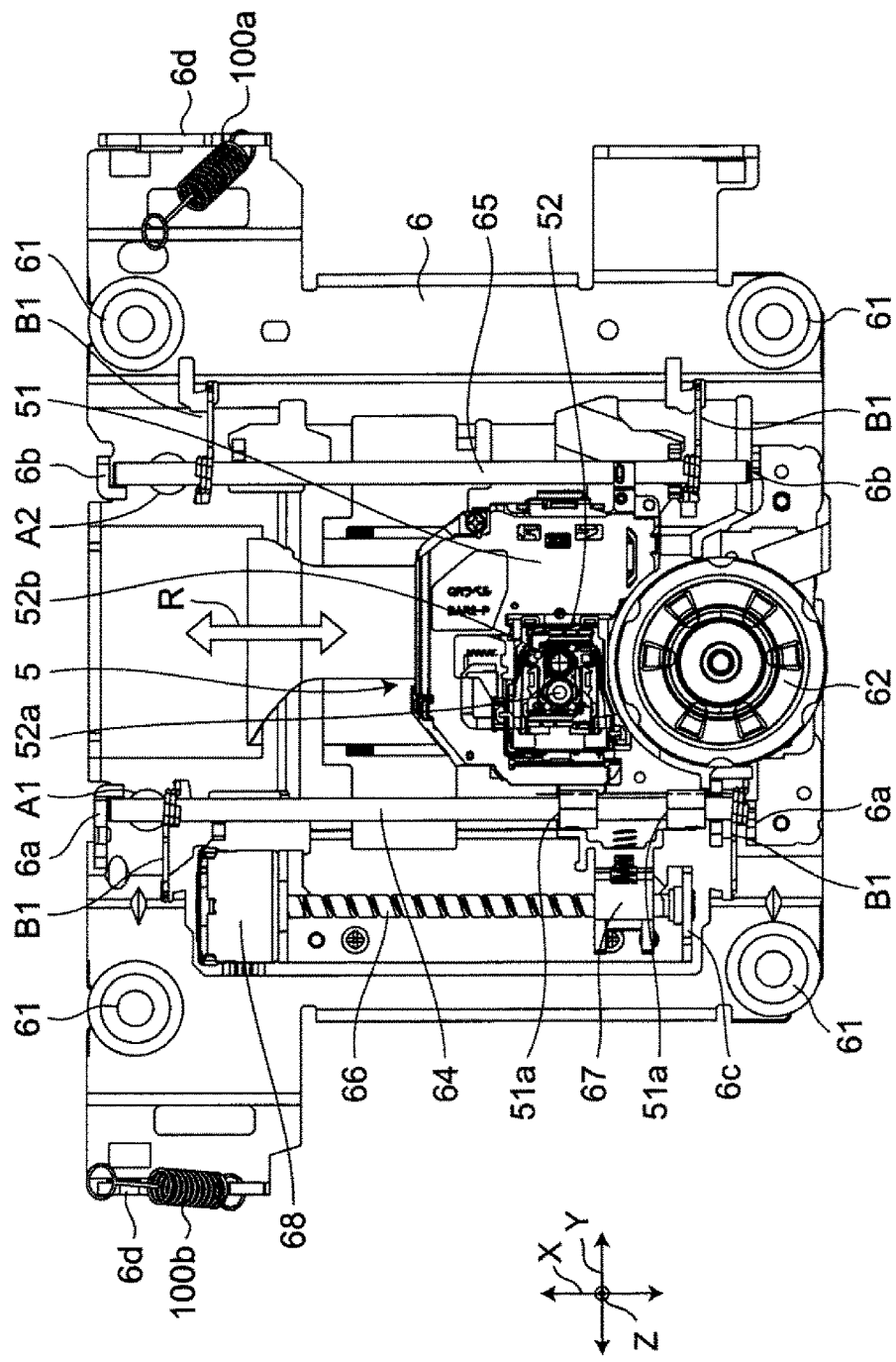
FIG. 9C is a plan view showing, from above, the first traverse chassis in the state shown in FIG. 9A.

FIG. 9A is a perspective view showing, from obliquely above, first traverse chassis 6 holding first optical pickup unit 5. FIG. 9B is a perspective view showing, from obliquely below, first traverse chassis 6 in this state. FIG. 9C is a plan view showing, from above, first traverse chassis 6 in this state.

First optical pickup unit 5 is provided in a manner capable of moving in radial direction R with respect to the first surface (the lower surface) of the disc at recording/reproduction position P2, and is structured to perform recording/reproduction of information on the first surface of the disc.

As shown in FIGS. 9A and 9C, first optical pickup unit 5 includes base member 51, and optical pickup 52 held by base member 51. Optical pickup 52 includes two lenses 52a, 52b, and performs recording/reproduction of information on the disc. For example, lens 52a is for a BD, and lens 52b is a DVD. Lenses 52a, 52b are attached to base member 51 in a manner capable of moving in a vertical direction.

First traverse chassis 6 is formed by performing bending processing, drilling processing or the like on a metal plate. In a plan view, first traverse chassis 6 has a substantially rectangular shape, and both end portions positioned on a rear side of housing 2 are protruded in width direction Y. Dampers 61 made of elastic members are mounted near four corner portions of first traverse chassis 6. First traverse chassis 6 is supported by four dampers 61 in a floating state (in a manner capable of floating in the vertical direction) with respect to mechanical chassis 22.

Turn table 62 for supporting the disc (not shown) placed on tray 3 at recording/reproduction position P2, and spindle motor 63 for rotating turn table 62 are attached to first traverse chassis 6. Also, main shaft 64 and auxiliary shaft 65 are attached to first traverse chassis 6.

Main shaft 64 made of metal has a columnar shape. Main shaft 64 is disposed in parallel with radial direction R of the disc, and slidably supports first optical pickup unit 5 by penetrating guide hole 51a provided to base member 51 and guides movement of first optical pickup unit 5.

Furthermore, main shaft 64 is inserted in hole portions of two coil torsion springs B1, and movement in a direction intersecting an axial direction (radial direction R) is restricted. Both end portions of each of two coil torsion springs B1 are engaged with a main surface of first traverse chassis 6. Movement of both end portions of main shaft 64 in the axial direction is restricted because the both end portions are in contact with a pair of retaining portions 6a, which are provided in a standing manner on the main surface of first traverse chassis 6 and which face each other.

Moreover, adjustment member A1, which is capable of adjusting a position of main shaft 64 in a thickness direction of first traverse chassis 6, is provided near one end portion of main shaft 64. For example, adjustment member A1 is a screw. Adjustment member A1 is screwed in through a through hole provided to first traverse chassis 6 so as to contact an outer circumferential surface of main shaft 64, and is capable of adjusting the position of main shaft 64 in the thickness direction of first traverse chassis 6 by having an amount of screwing adjusted.

Auxiliary shaft 65 made of metal also has a columnar shape. Auxiliary shaft 65 is disposed in parallel with main shaft 64, and slidably supports first optical pickup unit 5 in cooperation with main shaft 64 and guides the movement of first optical pickup unit 5.

Furthermore, auxiliary shaft 65 is inserted in hole portions of two coil torsion springs B2, and movement in a direction intersecting an axial direction (radial direction R) is restricted. Both end portions of each of two coil torsion springs B2 are engaged with the main surface of first traverse chassis 6. Movement of both end portions of auxiliary shaft 65 in the axial direction is restricted because the both end portions are in contact with a pair of retaining portions 6b, which are provided in a standing manner on the main surface of first traverse chassis 6 and which face each other.

Moreover, adjustment members A2, which are capable of adjusting a position of auxiliary shaft 65 in the thickness direction of first traverse chassis 6, are provided near both end portions of auxiliary shaft 65. For example, adjustment members A2 are screws. Adjustment members A2 are screwed in through respective through holes provided to first traverse chassis 6 so as to contact an outer circumferential surface of auxiliary shaft 65, and are capable of adjusting the position of auxiliary shaft 65 in the thickness direction of first traverse chassis 6 by having an amount of screwing adjusted.

Furthermore, lead screw 66 is attached to first traverse chassis 6. Lead screw 66 is disposed in parallel with main shaft 64, on a side farther away (at a position more distant) than main shaft 64 when seen from first optical pickup unit 5. That is, lead screw 66 is disposed extending in parallel with radial direction R.

Nut portion 67 is screwed with lead screw 66. Nut portion 67 is attached to base member 51 of first optical pickup unit 5. Stepping motor 68 for generating a rotation force is attached to a first end portion of lead screw 66. A second end portion of lead screw 66 is rotatably held by holding portion 6c, which is provided in a standing manner on the main surface of first traverse chassis 6, and movement in an axial direction is restricted.

When stepping motor 68 generates a rotation force, lead screw 66 rotates around the axis, and nut portion 67 screwed with lead screw 66 moves in parallel with radial direction R. First optical pickup unit 5 to which nut portion 67 is attached thereby moves in radial direction R.

Meanwhile, as shown in FIGS. 4 to 6, main shaft cover C1 may be attached to first traverse chassis 6 so as to cover main shaft 64, and auxiliary shaft cover C2 may be attached to first traverse chassis 6 so as to cover auxiliary shaft 65. These covers can prevent a user from accidentally touching main shaft 64 and auxiliary shaft 65. Also, these covers can prevent a lubricant, such as grease, applied to main shaft 64 and auxiliary shaft 65 from being splashed to a periphery, and the disc may be prevented from being fouled.

Figure 10A:
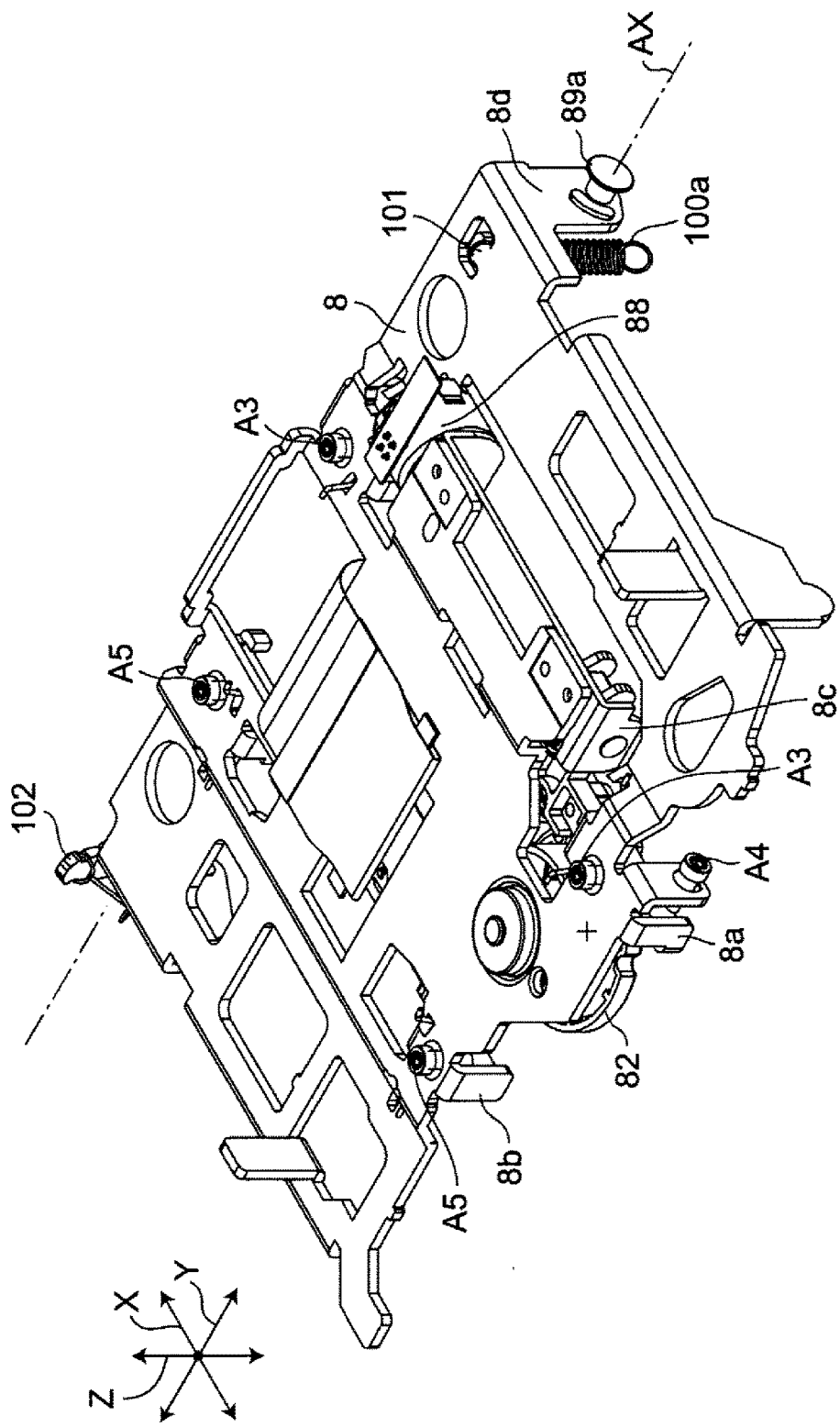
FIG. 10A is a perspective view showing, from obliquely above, a second traverse chassis, of the disc device shown in FIG. 3, holding a second optical pickup unit.
Figure 10B:
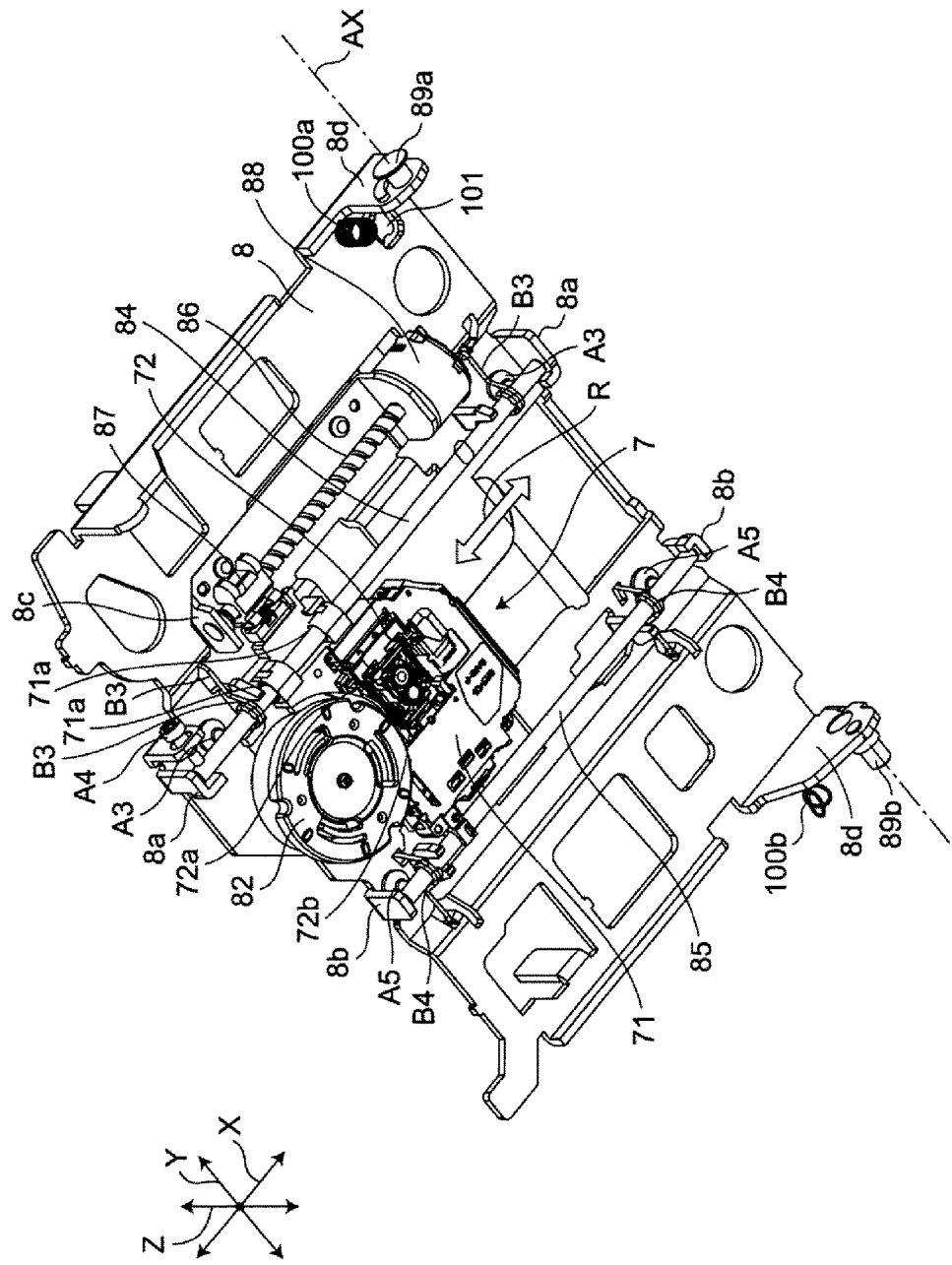
FIG. 10B is a perspective view showing, from obliquely below, the second traverse chassis shown in FIG. 10A.
Figure 10C:
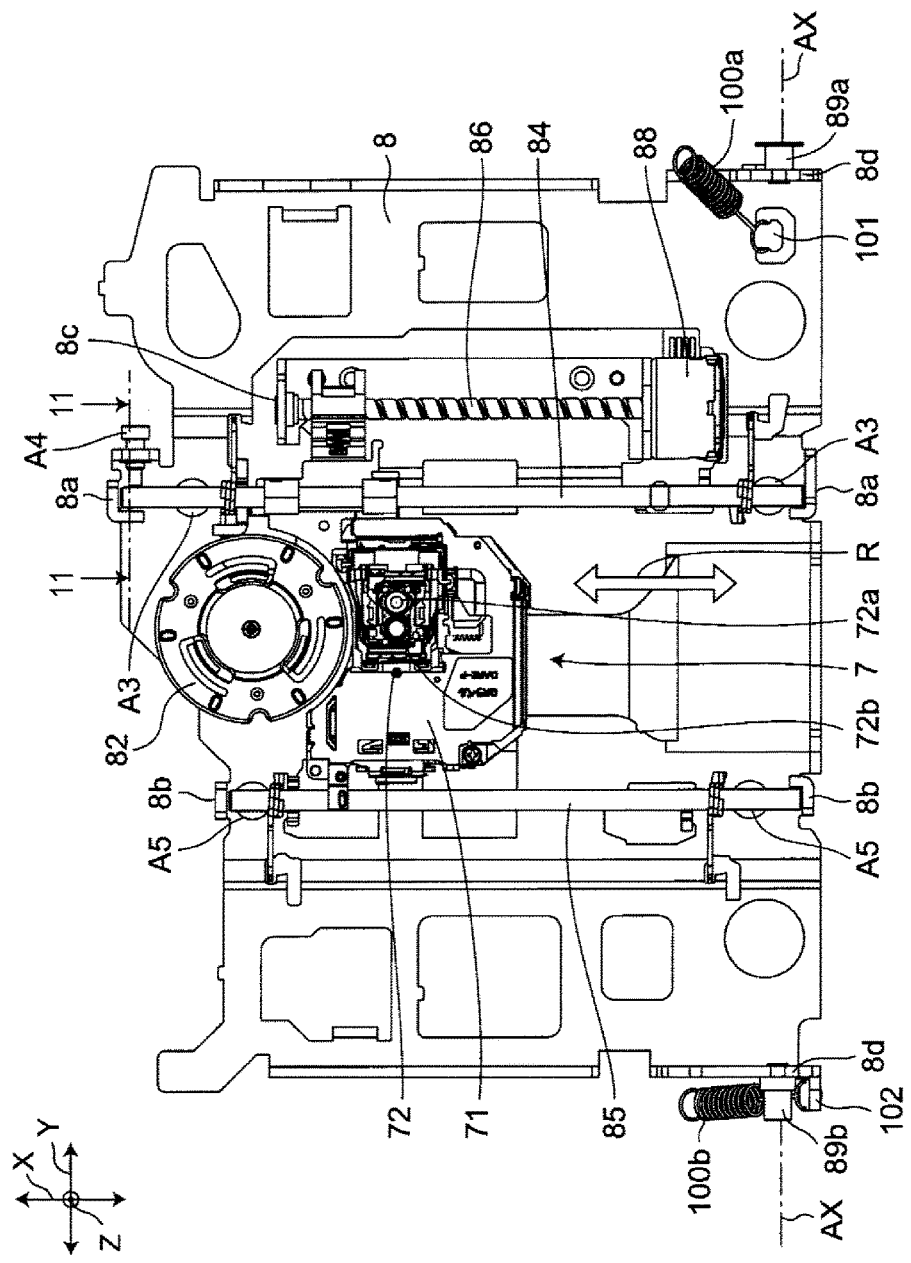
FIG. 10C is a plan view showing, from below, the second traverse chassis shown in FIG. 10A.

FIG. 10A is a perspective view showing, from obliquely above, second traverse chassis 8 holding second optical pickup unit 7. FIG. 10B is a perspective view showing, from obliquely below, second traverse chassis 8 in this state. FIG. 10C is a plan view showing, from below, second traverse chassis 8 in this state.

Second optical pickup unit 7 is provided in a manner capable of moving in radial direction R with respect to the second surface (an upper surface) of the disc at recording/reproduction position P2, and is structured to perform recording/reproduction of information on the second surface of the disc.

As shown in FIGS. 10B and 10C, second optical pickup unit 7 includes base member 71, and optical pickup 72 held by base member 71. Optical pickup 72 includes two lenses 72a, 72b, and performs recording/reproduction of information on the disc. For example, lens 72a is for a BD, and lens 72b is for a DVD. Lenses 72a, 72b are attached to base member 71 in a manner capable of moving in a vertical direction.

Second traverse chassis 8 is formed by performing bending processing, drilling processing or the like on a metal plate. In a plan view, second traverse chassis 8 is formed into a substantially rectangular shape. Clamper 82 for clamping the disc on turn table 62 at recording/reproduction position P2 is attached to second traverse chassis 8. Clamper 82 is attached to second traverse chassis 8 with an allowance so as to facilitate alignment with turn table 62. Specifically, as shown in FIG. 3, clamper 82 penetrates a through hole provided to second traverse chassis 8 via yoke 82a, and is attached to clamper stopper 82b. Also, turn table 62 and clamper 82 include magnets (not shown) so as to be pulled toward each other by a magnetic force.

Main shaft 84 and auxiliary shaft 85 are attached to second traverse chassis 8.

Main shaft 84 made of metal has a columnar shape. Main shaft 84 is disposed in parallel with radial direction R of the disc, and slidably supports second optical pickup unit 7 by penetrating guide hole 71a provided to base member 71 and guides movement of second optical pickup unit 7.

Furthermore, main shaft 84 is inserted in hole portions of two coil torsion springs B3, and movement in a direction intersecting an axial direction (radial direction R) is restricted. Both end portions of each of two coil torsion springs B3 are engaged with a main surface of second traverse chassis 8. Movement of both end portions of main shaft 84 in the axial direction is restricted because the both end portions are in contact with a pair of retaining portions 8a, which are provided in a standing manner on the main surface of second traverse chassis 8 and which face each other.

Figure 11:
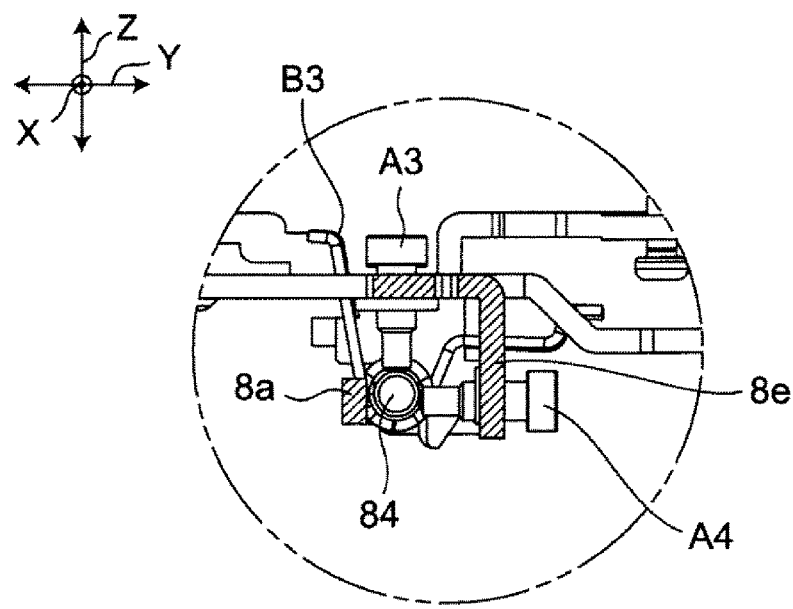
FIG. 11 is a cross-sectional view along line 11-11 in FIG. 10C.

Moreover, adjustment members A3, which are capable of adjusting a position of main shaft 84 in the thickness direction of second traverse chassis 8, are provided near both end portions of main shaft 84. For example, adjustment members A3 are screws. FIG. 11 is a cross-sectional view along line 11-11 in FIG. 10C. Adjustment members A3 are screwed in through respective through holes provided to second traverse chassis 8 so as to contact an outer circumferential surface of main shaft 84, and are capable of adjusting the position of main shaft 84 in the thickness direction of second traverse chassis 8 by having an amount of screwing adjusted.

Moreover, adjustment member A4, which is capable of adjusting a position of main shaft 84 in a width direction of second traverse chassis 8, is provided near one end portion of main shaft 84. Adjustment member A4 is screwed in through a through hole provided to standing wall 8e in a standing manner from the main surface of second traverse chassis 8 so as to be in contact with the outer circumferential surface of main shaft 84, and is capable of adjusting the position of main shaft 84 in the width direction of second traverse chassis 8 by having an amount of screwing adjusted. Positional accuracy of main shaft 84 can thus be increased.

Auxiliary shaft 85 made of metal also has a columnar shape. Auxiliary shaft 85 is disposed in parallel with main shaft 84, and slidably supports second optical pickup unit 7 in cooperation with main shaft 84 and guides the movement of second optical pickup unit 7.

Furthermore, auxiliary shaft 85 is inserted in hole portions of two coil torsion springs B4, and movement in a direction intersecting an axial direction (radial direction R) is restricted. Both end portions of each of two coil torsion springs B4 are engaged with the main surface of second traverse chassis 8. Movement of both end portions of auxiliary shaft 85 in the axial direction is restricted because the both end portions are in contact with a pair of retaining portions 8b, which are provided in a standing manner on the main surface of second traverse chassis 8 and which face each other.

Moreover, adjustment members A5, which are capable of adjusting a position of auxiliary shaft 85 in the thickness direction of second traverse chassis 8, are provided near both end portions of auxiliary shaft 85. For example, adjustment members A5 are screws. Adjustment members A5 are screwed in through respective through holes provided to second traverse chassis 8 so as to be in contact with an outer circumferential surface of auxiliary shaft 85, and are capable of adjusting the position of auxiliary shaft 85 in the thickness direction of second traverse chassis 8 by having an amount of screwing adjusted.

Furthermore, lead screw 86 is attached to second traverse chassis 8. Lead screw 86 is disposed in parallel with main shaft 84, on a side farther away (at a position more distant) than main shaft 84 when seen from second optical pickup unit 7. That is, lead screw 86 is disposed extending in parallel with radial direction R.

Nut portion 87 is screwed with lead screw 86. Nut portion 87 is attached to base member 71 of second optical pickup unit 7. Stepping motor 88 for generating a rotation force is attached to a first end portion of lead screw 86. A second end portion of lead screw 86 is rotatably held by holding portion 8c, which is provided in a standing manner on the main surface of second traverse chassis 8, and movement in an axial direction is restricted.

When stepping motor 88 generates the rotation force, lead screw 86 rotates around the axis, and nut portion 87 screwed with lead screw 86 moves in parallel with radial direction R. Second optical pickup unit 7 to which nut portion 87 is attached thereby moves in radial direction R.

Furthermore, as shown in FIGS. 10A to 10C, protruding pieces 8d protruding in the thickness direction from the main surface of second traverse chassis 8 are provided, respectively, to both end portions of second traverse chassis 8, on a rear side of housing 2. Each of protruding pieces 8d is provided with one of engaging pins 89a, 89b, which protrude in directions away from each other along width direction Y.

Furthermore, hook portion 101 (see FIGS. 10A and 10C) is formed near one end portion which is provided with engaging pin 89a, of the end portions of second traverse chassis 8 on the rear side of housing 2. A first end of coil spring 100a, which is an example of a first biasing member, is engaged with hook portion 101. Hook portion 101 is provided on the main surface of second traverse chassis 8 at a position inside second traverse chassis 8 in width direction Y. Moreover, hook portion 102 is formed near one end portion which is provided with engaging pin 89b, of the end portions of second traverse chassis 8 on the rear side of housing 2. A first end of coil spring 100b, which is an example of a second biasing member, is engaged with hook portion 102. Hook portion 102 extends from protruding piece 8d at a position outside second traverse chassis 8 in width direction Y.

On the other hand, as shown in FIGS. 9A to 9C, protruding pieces 6d protruding in thickness direction Z from the main surface of first traverse chassis 6 are provided, respectively, to both end portions of first traverse chassis 6, on the rear side of housing 2. As shown in FIG. 9A, each of protruding pieces 6d is provided with one of engaging portions 69a, 69b formed by cutting out portions at positions on the rear side of housing 2.

Moreover, hook portion 103 is formed to each of protruding pieces 6d by cutting out a portion at a position on the front side of housing 2. A second end of coil spring 100a is engaged with hook portion 103 of protruding piece 6d which is provided with engaging portion 69a. A second end of coil spring 100b is engaged with hook portion 103 of protruding piece 6d which is provided with engaging portion 69b.

Figure 12A:
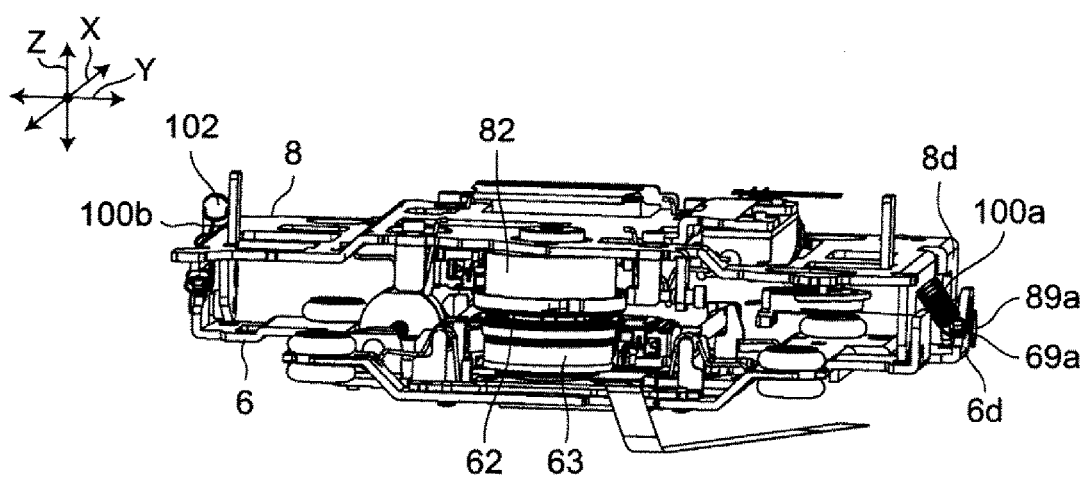
FIG. 12A is a perspective view showing a state where the first traverse chassis shown in FIG. 9A and the second traverse chassis shown in FIG. 10A are coupled to each other.
Figure 12B:
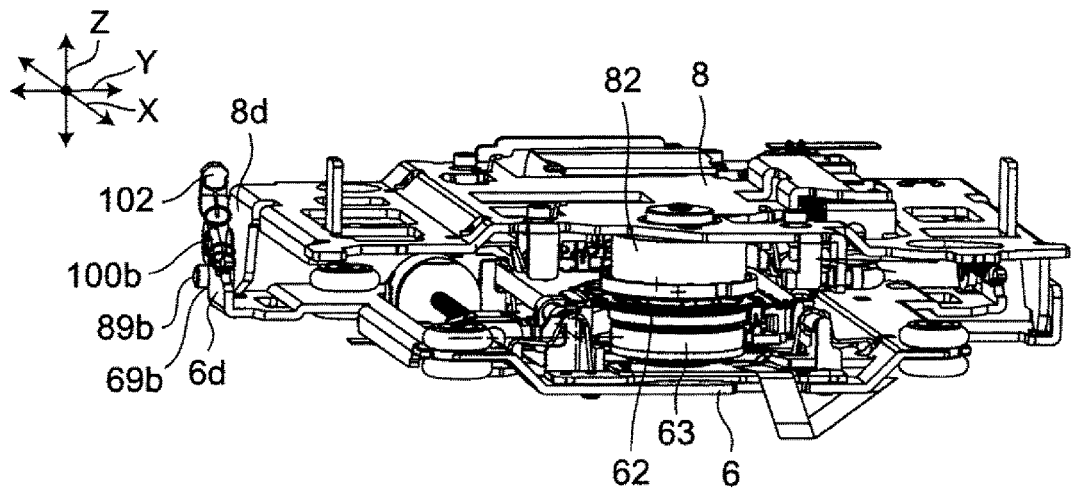
FIG. 12B is a perspective view showing, from a different direction, the state shown in FIG. 12A where the first traverse chassis and the second traverse chassis are coupled to each other.

FIGS. 12A and 12B are perspective views showing a state where first traverse chassis 6 holding first optical pickup unit 5 and second traverse chassis 8 holding second optical pickup unit 7 are coupled to each other.

Engaging pin 89a of second traverse chassis 8 is engaged with engaging portion 69a of first traverse chassis 6, and engaging pin 89b of second traverse chassis 8 is engaged with engaging portion 69b of first traverse chassis 6. In this state, the first end of coil spring 100a is engaged with hook portion 101, and the second end of coil spring 100a is engaged with hook portion 103. Moreover, the first end of coil spring 100b is engaged with hook portion 102, and the second end of coil spring 100b is engaged with hook portion 103. Accordingly, first traverse chassis 6 and second traverse chassis 8 are coupled to each other to be turnable around engaging pins 89a, 89b as turning axis AX. The coupled body of first traverse chassis 6 and second traverse chassis 8 is attached to mechanical chassis 22 in such a way that turning axis AX is at a rear side of housing 2 and extends in width direction Y of housing 2. That is, turning axis AX is located at a position opposite side surface 2A.

Engaging portion 69a and engaging pin 89a form a first coupling portion for coupling first traverse chassis 6 and second traverse chassis 8. The first coupling portion is located at a position, of housing 2, opposite side surface 2A. Coil spring 100a, which is an example of the first biasing member, is attached near the first coupling portion. Coil spring 100a is inclined with respect to each of conveying direction X, width direction Y, and thickness direction Z. The first end of coil spring 100a is attached to hook portion 103 of first traverse chassis 6 and the second end thereof is attached to hook portion 101 of second traverse chassis 8 in such a way as to cause coil spring 100a to incline in the above manner.

Furthermore, engaging portion 69b and engaging pin 89b form a second coupling portion for coupling first traverse chassis 6 and second traverse chassis 8. The second coupling portion is also located at a position, of housing 2, opposite side surface 2A. Coil spring 100b, which is an example of the second biasing member, is attached near the second coupling portion. That is, coil spring 100a, which is the first biasing member, is attached at a position closer to the first coupling portion than the second coupling portion, and coil spring 100b, which is the second biasing member, is attached at a position closer to the second coupling portion than the first coupling portion.

Coil spring 100b is inclined with respect to each of conveying direction X and thickness direction Z. The first end of coil spring 100b is attached to hook portion 103 of first traverse chassis 6 and the second end is attached to hook portion 102 of second traverse chassis 8 in such a way as to cause coil spring 100*b* to incline in the above manner.

By attaching coil springs 100*a*, 100*b* in the above manner, first traverse chassis 6 and second traverse chassis 8 may be coupled to each other while suppressing rocking or backlash. As a result, positional accuracy of first optical pickup unit 5 and second optical pickup unit 7 with respect to the disc may be further increased.

Next, turning mechanism 9 for turning first traverse chassis 6 and second traverse chassis 8 will be described.

Turning mechanism 9 uses a driving force of tray conveying mechanism 4 for conveying tray 3 from recording/reproduction position P2 to ejection position P1, and causes the front end portion of first traverse chassis 6 and the front end portion of second traverse chassis 8 to turn away from the disc, against a biasing force of coil springs 100*a*, 100*b* and around turning axis AX.

As shown in FIG. 3, turning mechanism 9 includes intermediate base 91, slide cam 92, and lifter 93.

Intermediate base 91 is made of resin, and is substantially U-shaped in plan view. Intermediate base 91 includes front wall 91*a* extending in width direction Y, and a pair of side walls 91*b* extending in conveying direction X. Engaging pins 91*c* protruding in directions away from each other along width direction Y are formed to respective rear end portions of side walls 91*b* of intermediate base 91. In FIG. 3, one of engaging pins 91*c* is shown. Engaging pins 91*c* are rotatably engaged with respective bearing portions (not shown) provided on the rear side of mechanical chassis 22 of housing 2. Intermediate base 91 is thereby enabled to turn around engaging pins 91*c* as a turning axis.

Intermediate base 91 is provided with a support portion (not shown) for supporting, from below, two dampers 61 provided on the front side of first traverse chassis 6*to*. First traverse chassis 6 and intermediate base 91 are allowed to integrally turn because the support portion of intermediate base 91 supports dampers 61.

Intermediate base 91 is provided with two cam pins 91*d* protruding forward on front wall 91*a*. Cam pins 91*d* are engaged with two cam grooves 92*a* in slide cam 92 shown in FIG. 7B.

FIGS. 13A to 13D are cross-sectional views schematically showing cam pins 91*d* of intermediate base 91 moving along cam grooves 92*a* in slide cam 92. Intermediate base 91 and first traverse chassis 6 are raised or lowered by cam pins 91*d* moving along cam grooves 92*a*.

Slide cam 92 is made of resin, is a rectangular plate and is disposed along width direction Y. Slide cam 92 is integrally formed with slider 45. Accordingly, slide cam 92 moves integrally with slider 45. As shown in FIGS. 13A to 13D, each of cam grooves 92*a* of slide cam 92 includes first linear portion 92*aa*, inclined portion 92*ab*, and second linear portion 92*ac*. First linear portion 92*aa* and second linear portion 92*ac* extend in width direction Y. First linear portion 92*aa* is along an upper side of slide cam 92, and second linear portion 92*ac* is along a lower side of slide cam 92. In FIGS. 13A to 13D, each inclined portion 92*ab* connects a left end portion of first linear portion 92*aa* and a right end portion of second linear portion 92*ac*.

As shown in FIG. 7A, lifter 93 is a metal member having a substantially U-shape in side view. Lifter 93 includes front wall 93*a* extending in width direction Y, and a pair of side walls 93*b* each having a plane parallel to conveying direction X and thickness direction Z. Engaging pins 93*c* protruding in directions away from each other along width direction Y are formed to front upper portions of respective side walls 93*b*. Engaging pins 93*c* are turnably engaged with bearing portions (not shown) provided to front upper portions of mechanical chassis 22 of housing 2. Lifter 93 is thereby enabled to turn around engaging pins 93*c* as a turning axis.

As shown in FIG. 6, front wall 93*a* has inclined surface 93*d* more inclined forward as it is farther away from drive gear 44 in width direction Y. When slider 45 moves in width direction Y, a part of slider 45 slides on inclined surface 93*d*, and lifter 93 thereby turns around engaging pins 93*c* as a turning axis.

When turning to hold up the rear end portion with engaging pin 93*c* as a turning axis, each of side walls 93*b* contacts a part of second traverse chassis 8 and holds up the front end portion of second traverse chassis 8.

<1-2. Operation>

Operation of the disc device having the structure described above will be described below.

Figure 13A:
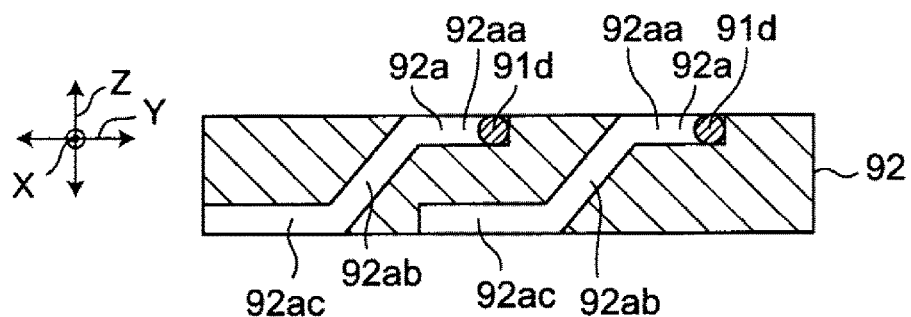
FIG. 13A is a cross-sectional view schematically showing cam pins of an intermediate base of the disc device shown in FIG. 3 moving along cam grooves provided to a slide cam.
Figure 14:
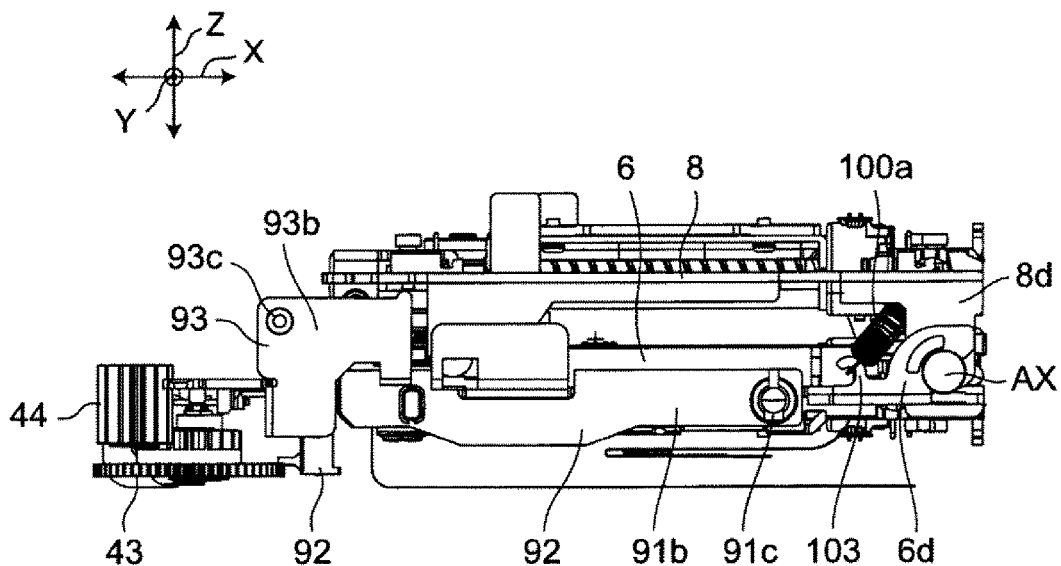
FIG. 14 is a side view showing a part of the disc device in a state where a housing is removed from the disc device shown in FIG. 1, where various components, devices and mechanisms are in a state where the tray is at the recording/reproduction position.
Figure 15:
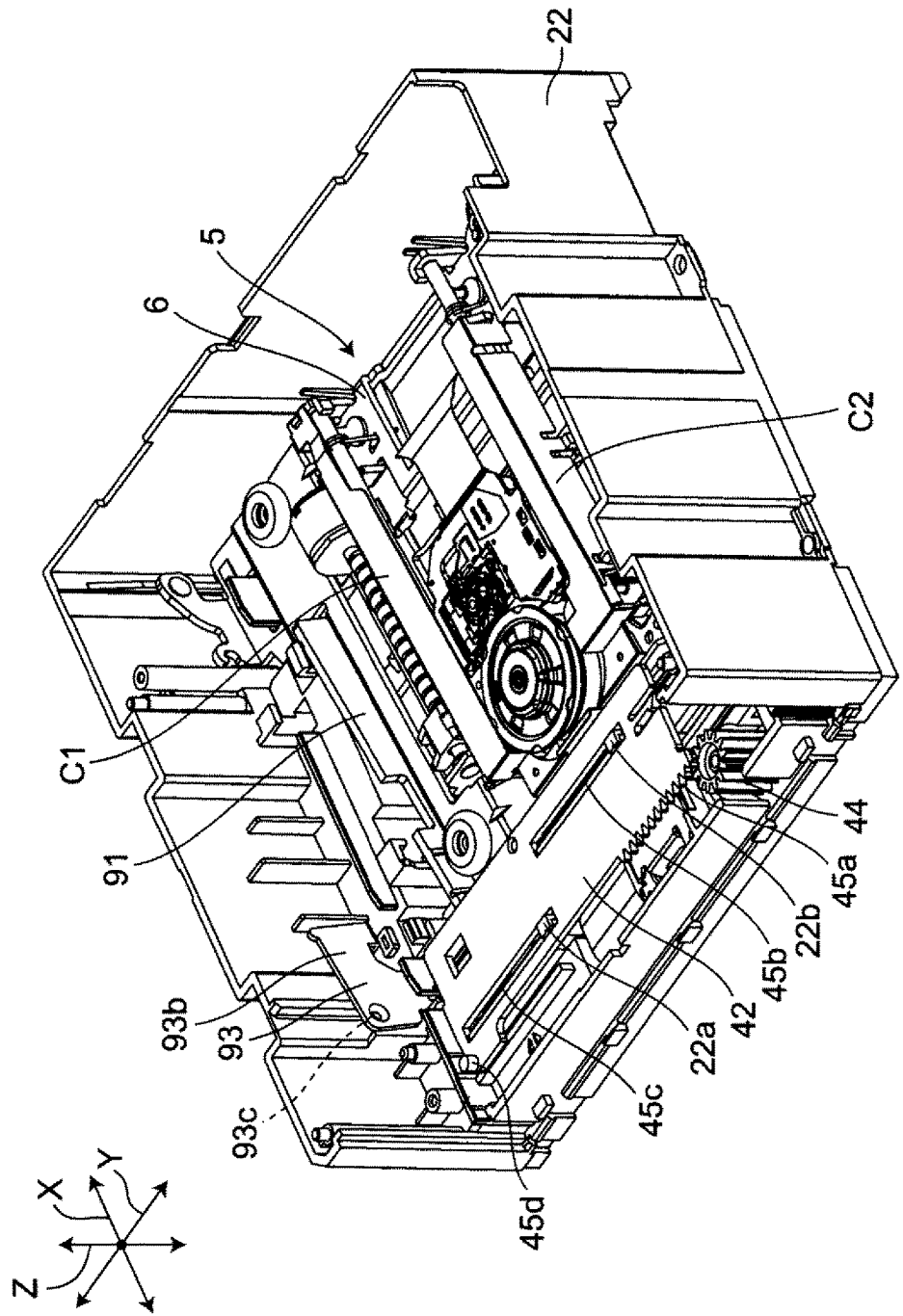
FIG. 15 is a perspective view showing a part of the disc device in a state where the tray is further removed from the state shown in FIG. 5.
Figure 16:
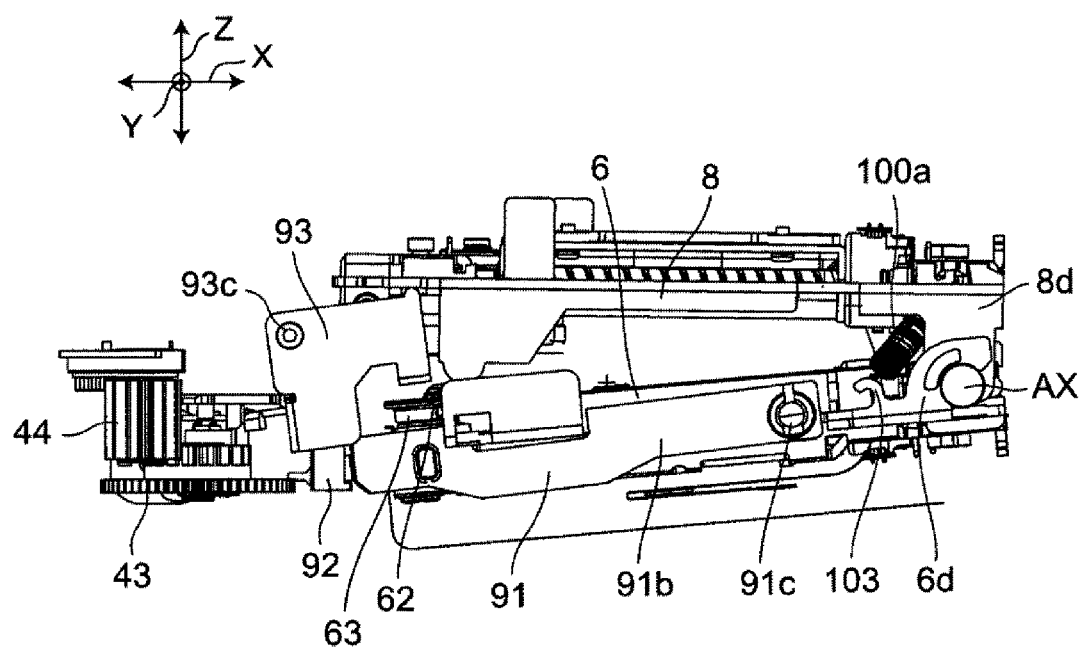
FIG. 16 is a side view showing a part of the disc device in the state shown in FIG. 14, where the various components, devices and mechanisms are in a state where the tray is at the ejection position.

FIG. 14 is a side view showing a part of disc device 1 in a state where housing 2 is removed from disc device 1, where various components, devices and mechanisms are in a state where tray 3 is at recording/reproduction position P2. FIGS. 6 and 13A also show the states of various components, devices and mechanisms when tray 3 is at recording/reproduction position P2. Moreover, FIG. 15 is a perspective view showing a part of disc device 1 in a state where tray 3 is further removed from the state shown in FIG. 5. FIG. 16 is a side view showing a part of disc device 1 in the state shown in FIG. 14, where various components, devices and mechanisms are in a state where tray 3 is at ejection position P1.

As shown in FIG. 6, when tray 3 is at recording/reproduction position P2, slider 45 is at a position where rack 45*a* is meshed with drive gear 44. As shown in FIG. 13A, cam pins 91*d* of intermediate base 91 are positioned at respective first linear portions 92*aa*. As shown in FIG. 14, first traverse chassis 6 and second traverse chassis 8 are coupled to each other, and are parallel to conveying direction X.

When drive gear 44 is rotated from the state shown in FIG. 6, slider 45 on which rack 45*a* is meshed with drive gear 44 is conveyed in width direction Y to move away from drive gear 44. When slider 45 is conveyed, cam pins 91*d* of intermediate base 91 slide in respective first linear portions 92*aa*, and move to positions shown in FIG. 13B.

Figure 13B:
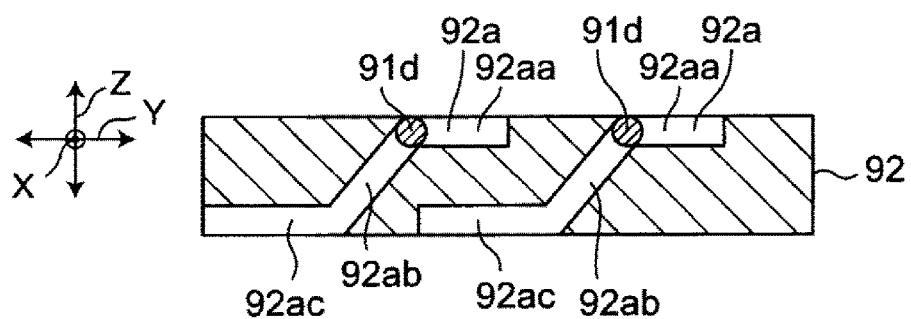
FIG. 13B is a cross-sectional view schematically showing the cam pins of the intermediate base shown in FIG. 13A moving further along the cam grooves provided to the slide cam.
Figure 13C:
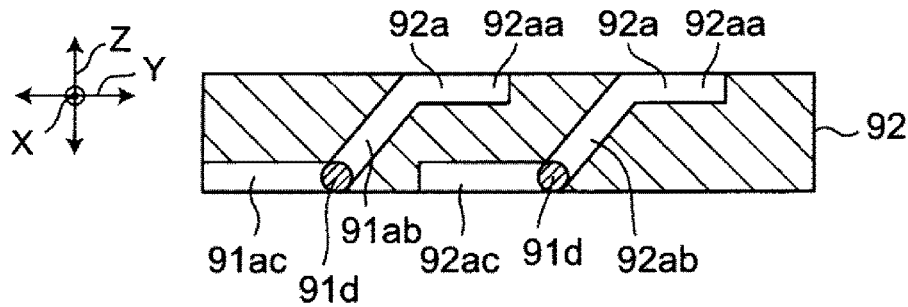
FIG. 13C is a cross-sectional view schematically showing the cam pins of the intermediate base shown in FIG. 13B moving further along the cam grooves provided to the slide cam.

Then, when drive gear 44 is further rotated, and slider 45 is conveyed in width direction Y to move away from drive gear 44, cam pins 91*d* of intermediate base 91 slide in respective inclined portions 92*ab*, and move to positions shown in FIG. 13C. That is, each of cam pins 91*d* is pushed down by inclined portion 92*ab*, intermediate base 91 is turned around engaging pins 91*c* as a turning axis, and front wall 91*a* of intermediate base 91 comes down. Accordingly, the front end portion of first traverse chassis 6 supported by intermediate base 91 comes down, and first optical pickup unit 5 moves away from tray 3.

Figure 13D:
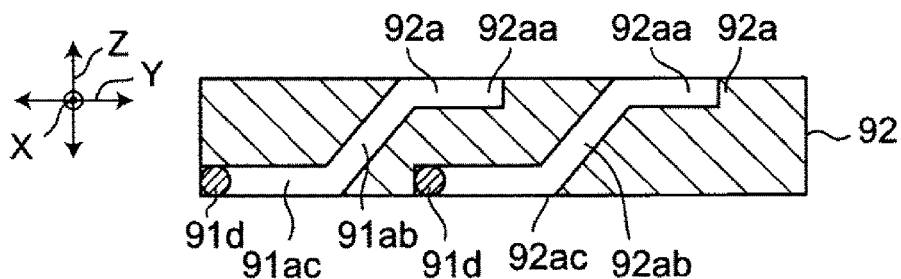
FIG. 13D is a cross-sectional view schematically showing the cam pins of the intermediate base shown in FIG. 13C moving further along the cam grooves provided to the slide cam.

Then, when drive gear 44 is further rotated, and slider 45 is further conveyed in width direction Y, cam pins 91*d* of intermediate base 91 slide in respective second linear portions 92*ac*, and move to positions shown in FIG. 13D. In the process, a part of slider 45 slides on inclined surface 93*d* of lifter 93, and pushes inclined surface 93*d* in conveying direction X toward the rear side of housing 2. Then, as shown in FIG. 15, each of side walls 93*b* of lifter 93 turns around engaging pin 93*c* as a turning axis so as to hold up the rear end portion. As shown in FIG. 16, this turning causes each of side walls 93*b* of lifter 93 to make contact with a part of second traverse chassis 8, and to hold up the front end portion of second traverse chassis 8. Second optical pickup unit 7 thereby moves away from tray 3. Furthermore, when cam pins 91d of intermediate base 91 move to positions in second linear portions 92ac as shown in FIG. 13D, meshing between drive gear 44 and rack 45a of slider 45 is released. As a result, tray 3 is allowed to move to ejection position P1.

Movement of tray 3 from ejection position P1 to recording/reproduction position P2 is performed by basically the reverse operation of movement of tray 3 from recording/reproduction position P2 to ejection position P1. The movement will be described below.

As shown in FIG. 8, tray 3 is provided with cam groove 3e on the back side thereof. Cam pin 45d provided to slider 45 as shown in FIGS. 6 and 7A is engaged with cam groove 3e. Cam groove 3e includes first linear portion 3ea, first inclined portion 3eb, second linear portion 3ec, and second inclined portion 3ed. First linear portion 3ea and second linear portion 3ec extend in conveying direction X. First inclined portion 3eb and second inclined portion 3ed are inclined with respect to conveying direction X and width direction Y. In FIG. 8, first inclined portion 3eb connects a lower end portion of first linear portion 3ea and an upper end portion of second linear portion 3ec. A first end portion of second inclined portion 3ed is connected to a lower end portion of second linear portion 3ec, and a second end portion of second inclined portion 3ed is released (opened).

When tray 3 is located at ejection position P1, cam pin 45d of slider 45 is positioned inside first linear portion 3ea. When tray 3 is pushed toward the inside of housing 2 from this state, cam pin 45d passes through first linear portion 3ea, slides inside first inclined portion 3eb, and moves into second linear portion 3ec. Slider 45 is thus pushed in width direction Y to come closer to drive gear 44, and drive gear 44 and rack 45a of slider 45 are meshed together (see FIG. 15).

When drive gear 44 is rotated in reverse direction in this state, drive gear 44 and tray 3 which is meshed by rack 3d (see FIG. 8) are conveyed to recording/reproduction position P2. At this time, movement of slider 45 in width direction Y is restricted because cam pin 45d slides in second linear portion 3ec.

When cam pin 45d passes through second linear portion 3ec and slides in second inclined portion 3ed, drive gear 44 is rotated in the reverse direction, and slider 45 moves in width direction Y so that cam pin 45d moves closer to drive gear 44.

Then, when cam pin 45d of slider 45 passes through an end portion of second inclined portion 3ed, movement of slider 45 in width direction Y is no longer restricted, and slider 45 moves further in width direction Y so that cam pin 45d moves closer to drive gear 44. Cam pins 91d of intermediate base 91 thereby slide in respective second linear portions 92ac, and move to positions shown in FIG. 13C. In the process, a part of slider 45 slides on inclined surface 93d of lifter 93, and front wall 93a of lifter 93 moves in conveying direction X toward the front side of housing 2. Then, as shown in FIG. 16, side walls 93b of lifter 93 turn around engaging pins 93c as a turning axis so as to move away from second traverse chassis 8. Second traverse chassis 8 thereby comes down, and second optical pickup unit 7 moves closer to tray 3.

Then, when slider 45 is conveyed further in width direction Y so as to move cam pin 45d closer to drive gear 44, cam pins 91d of intermediate base 91 slide in respective inclined portions 92ab, and move to positions shown in FIG. 13B. That is, cam pins 91d are held up by respective inclined portions 92ab, intermediate base 91 is turned around engaging pins 91c as a turning axis, and front wall 91a of intermediate base 91 moves upward. The front end portion of first traverse chassis 6 supported by intermediate base 91 moves thereby upward, and first optical pickup unit 5 is moved close to tray 3. At this time, the disc on tray 3 is clamped on turn table 62 by clamper 82. When spindle motor 63 is rotated in this state, recording/reproduction of information on the disc is enabled.

<1-3. Effects, Etc.>

As described above, in the present exemplary embodiment, coil spring 100a is attached to first traverse chassis 6 and second traverse chassis 8 while being inclined with respect to each of conveying direction X, width direction Y and thickness direction Z. This allows first traverse chassis 6 and second traverse chassis 8 to be coupled to each other without rocking or backlash. As a result, positional accuracy of first optical pickup unit 5 and second optical pickup unit 7 with respect to the disc may be further increased.

Meanwhile, it is sufficient that at least one of coil springs 100a, 100b is attached to first traverse chassis 6 and second traverse chassis 8 while being inclined with respect to each of conveying direction X, width direction Y and thickness direction Z. The effect described above may thereby be achieved.

Furthermore, in the present exemplary embodiment, coil spring 100a, which is the first biasing member, is attached near engaging portion 69a and engaging pin 89a both forming the first coupling portion, and coil spring 100b, which is the second biasing member, is attached near engaging portion 69b and engaging pin 89b both forming the second coupling portion. That is, coil springs 100a, 100b are disposed near turning axis AX. Accordingly, the biasing forces of coil springs 100a, 100b on the front end portion of first traverse chassis 6 and the front end portion of second traverse chassis 8 are small, and second traverse chassis 8 may be easily held up by lifter 93.

Moreover, in the present exemplary embodiment, turning mechanism 9 causes each of the front end portions of first traverse chassis 6 and of second traverse chassis 8 to turn away from tray 3, around turning axis AX and against the biasing forces of coil springs 100a, 100b. Accordingly, first traverse chassis 6 and second traverse chassis 8 may reliably be prevented from coming into contact with both main surfaces (recording surfaces) of the disc to damage both main surfaces of the disc.

Moreover, in the present exemplary embodiment, turning mechanism 9 uses the driving force of tray conveying mechanism 4 for conveying tray 3 from recording/reproduction position P2 to ejection position P1 to cause first traverse chassis 6 and second traverse chassis 8 to turn around turning axis AX. Accordingly, a separate motor does not have to be provided to drive turning mechanism 9. As a result, an increase in the number of components may be suppressed, and thus, an increase in the size and the cost can be suppressed.

Furthermore, in the present exemplary embodiment, clamper 82 is provided to second traverse chassis 8. Accordingly, a clamp plate does not have to be separately provided to provide clamper 82. As a result, an increase in the number of components may be suppressed, and thus, an increase in the size and the cost can be suppressed.

Moreover, in the present exemplary embodiment, adjustment members A3, A5, which are capable of adjusting the positions of main shaft 84 and auxiliary shaft 85 in the thickness direction of second traverse chassis 8, are provided near both end portions of main shaft 84 and both end portions of auxiliary shaft 85, respectively. Accordingly, positional accuracy of main shaft 84 and auxiliary shaft 85 in the thickness direction of second traverse chassis 8 may be increased without depending on dimensional accuracy of the components. As a result, positional accuracy of first optical pickup unit 5 and second optical pickup unit 7 with respect to the disc may be further increased.

As described above, the exemplary embodiment has been described to exemplify the technology of the present disclosure. However, the technology of the present disclosure is not limited to the above exemplary embodiment, and may be applied to exemplary embodiments which have been subjected to modifications, substitutions, additions, or omissions as appropriate. Moreover, it is also possible to combine the structural elements in the exemplary embodiment described above to obtain new exemplary embodiments.

Moreover, in the description above, the exemplary embodiment is described to exemplify the technology of the present disclosure, and the appended drawings and the detailed description are provided for this purpose. Accordingly, the structural elements shown in the appended drawings and described in the detailed description include not only structural elements that are essential for solving the problem but also other structural elements that are not essential for solving the problem so as to exemplify the technology. Hence, that these non-essential structural elements are shown in the appended drawings and described in the detailed description does not cause these structural elements to be immediately recognized as being essential.

Furthermore, because the exemplary embodiment described above is for exemplifying the technology of the present disclosure, various modifications, substitutions, additions, and omissions may be performed within the scope of claims and within an equivalent scope thereof.

A disc device of the present disclosure may increase positional accuracy of the first optical pickup unit and the second optical pickup unit with respect to a disc, and is advantageous as a disc device for simultaneously performing recording/reproduction on both main surfaces of the disc.

What is claimed is:

1. A disc device comprising:
    a housing having a tray conveying opening formed at a side surface;
    a tray on which a disc is to be placed;
    a tray conveying mechanism which conveys the tray in a conveying direction through the tray conveying opening, between an ejection position outside the housing and a recording/reproduction position inside the housing;
    a first optical pickup unit provided in a manner capable of moving in a radial direction of the disc with respect to a first surface of the disc at the recording/reproduction position, the first optical pickup unit performing at least one of recording and reproduction of information on the first surface;
    a first traverse chassis movably holding the first optical pickup unit;
    a second optical pickup unit provided in a manner capable of moving in the radial direction with respect to a second surface on a back side of the first surface of the disc at the recording/reproduction position, the second optical pickup unit performing at least one of recording and reproduction of information on the second surface;
    a second traverse chassis movably holding the second optical pickup unit; and
    a first biasing member and a second biasing member biasing the first traverse chassis and the second traverse chassis, respectively, in directions of coming closer to each other,
    wherein the first traverse chassis and the second traverse chassis are coupled to each other to turn around a turning axis, and the turning axis is at a position, of the housing, opposite the side surface of the housing and extends in a width direction of the housing orthogonal to the conveying direction and a thickness direction of the housing, and
    at least one of the first biasing member and the second biasing member includes a first end attached to the first traverse chassis and a second end attached to the second traverse chassis, and is inclined with respect to each of the conveying direction, the thickness direction and the width direction.

2. The disc device according to claim 1, further comprising a first coupling portion and a second coupling portion provided at positions, of the housing, opposite the side surface, and at respective end portions in the width direction,
    wherein the first traverse chassis and the second traverse chassis are coupled by the first coupling portion and the second coupling portion,
    the first biasing member is attached near the first coupling portion, and
    the second biasing member is attached near the second coupling portion.

3. The disc device according to claim 1,
    wherein each of the first traverse chassis and the second traverse chassis has a front end portion, and a rear end portion that is farther away from the side surface than the front end portion is, and
    the disc device further comprises a turning mechanism which causes the front end portion of each of the first traverse chassis and the second traverse chassis to turn away from the tray, around the turning axis and against a biasing force of the first biasing member and the second biasing member.

4. The disc device according to claim 3, wherein the turning mechanism uses a driving force of the tray conveying mechanism for conveying the tray from the recording/reproduction position to the ejection position to cause the front end portion of each of the first traverse chassis and the second traverse chassis to turn away from the tray, around the turning axis.

5. The disc device according to claim 1, further comprising a turn table which supports the disc that is placed on the tray,
    wherein the first traverse chassis is provided with a spindle motor which rotates the turn table, and
    the second traverse chassis is provided with a clamper which clamps the disc on the turn table.

6. The disc device according to claim 1,
    wherein the a main shaft and an auxiliary shaft are attached to the second traverse chassis,
    the second optical pickup unit is provided with a guide hole,
    the main shaft is disposed in parallel with the radial direction of the disc, and slidably supports the second optical pickup unit by penetrating the guide hole and guides movement of the second optical pickup unit,
    the auxiliary shaft is disposed in parallel with the main shaft, and slidably supports the second optical pickup unit in cooperation with the main shaft and guides movement of the second optical pickup unit, and adjustment members are provided near both end portions of the main shaft and near both end portions of the auxiliary shaft, each of the adjustment members being capable of adjusting a position of a corresponding one of the main shaft and the auxiliary shaft in a thickness direction of the second traverse chassis.

* * * * *